United States Patent
Hashiguchi et al.

(10) Patent No.: US 7,830,789 B2
(45) Date of Patent: Nov. 9, 2010

(54) METHOD FOR ACCOMMODATING SIGNAL PATHS TO RING NETWORK

(75) Inventors: Tomohiro Hashiguchi, Kawasaki (JP); Toru Katagiri, Kawasaki (JP); Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 12/215,449

(22) Filed: Jun. 27, 2008

(65) Prior Publication Data

US 2009/0003198 A1    Jan. 1, 2009

(30) Foreign Application Priority Data

Jun. 28, 2007    (JP) .............................. 2007-170203

(51) Int. Cl.
*H04L 12/42* (2006.01)

(52) U.S. Cl. ....................... 370/222; 370/238; 370/400; 370/477

(58) Field of Classification Search ........................ None
See application file for complete search history.

(56) References Cited

U.S. PATENT DOCUMENTS

| | | | | |
|---|---|---|---|---|
| 6,606,297 | B1 * | 8/2003 | Magill et al. ................. | 370/216 |
| 7,342,873 | B1 * | 3/2008 | Nagarajan ..................... | 370/217 |
| 7,675,899 | B2 * | 3/2010 | Acharya et al. ............. | 370/351 |
| 7,680,032 | B1 * | 3/2010 | Pheiffer et al. .............. | 370/222 |
| 2001/0012298 | A1 * | 8/2001 | Harshavardhana et al. .. | 370/405 |
| 2003/0009598 | A1 * | 1/2003 | Gunluk et al. ............... | 709/251 |
| 2003/0163593 | A1 * | 8/2003 | Knightly ....................... | 709/251 |
| 2004/0010592 | A1 | 1/2004 | Carver et al. | |
| 2006/0250986 | A1 * | 11/2006 | Alharbi et al. .............. | 370/258 |
| 2007/0076636 | A1 * | 4/2007 | Chow et al. .................. | 370/258 |
| 2008/0080554 | A1 | 4/2008 | Hashiguchi et al. | |

FOREIGN PATENT DOCUMENTS

| | | |
|---|---|---|
| JP | 2000-232472 | 8/2000 |
| JP | 2002-374283 | 12/2002 |
| JP | 2003-520496 | 7/2003 |
| JP | 2007-300167 | 11/2007 |
| JP | 2008-22523 | 1/2008 |
| JP | 2008-92171 | 4/2008 |
| WO | 01/52475 A2 | 7/2001 |

OTHER PUBLICATIONS

Cover page of Japanese Patent Publication No. 2003-520496, published Jul. 2, 2003. (1 pg).

* cited by examiner

*Primary Examiner*—Min Jung
(74) *Attorney, Agent, or Firm*—Staas & Halsey LLP

(57) ABSTRACT

According an aspect of the embodiment, there is provided a method for accommodating signal paths to a ring network. A demand chain is defined as a series of traffic demands in which each traffic demand shares one of the pair of terminal nodes pointed thereby with at least one adjacent traffic demand and the number of pairs of terminal nodes pointed by traffic demands in the series of traffic demands is maximized. Each traffic demand of the demand chain is corresponded to a demand accommodating route which is defined as a route between the pair of terminal nodes on the ring network pointed by the each traffic demand and arranged in a predetermined rotation direction on the ring network. Then, signal paths required by traffic demands each pointing a pair of terminal nodes both included in the demand accommodating route chain are accommodated to the demand accommodating route chain.

9 Claims, 34 Drawing Sheets

FIG. 4
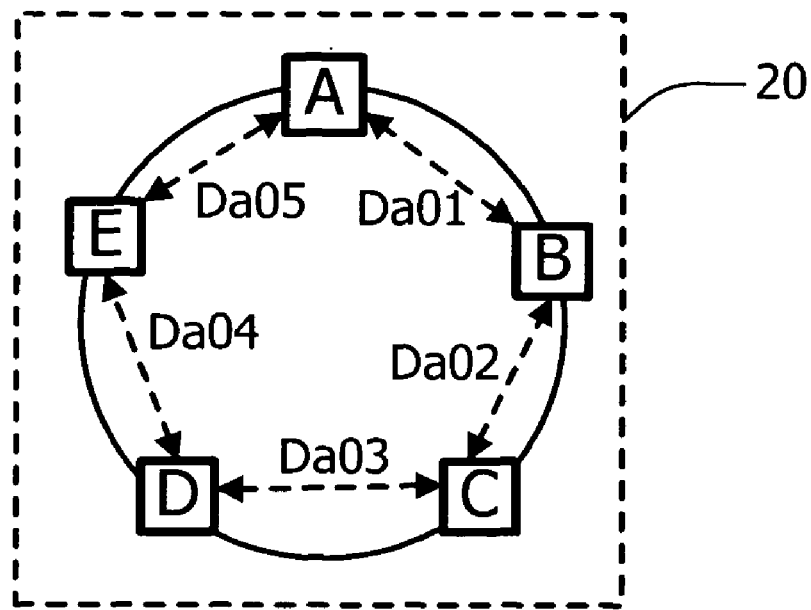
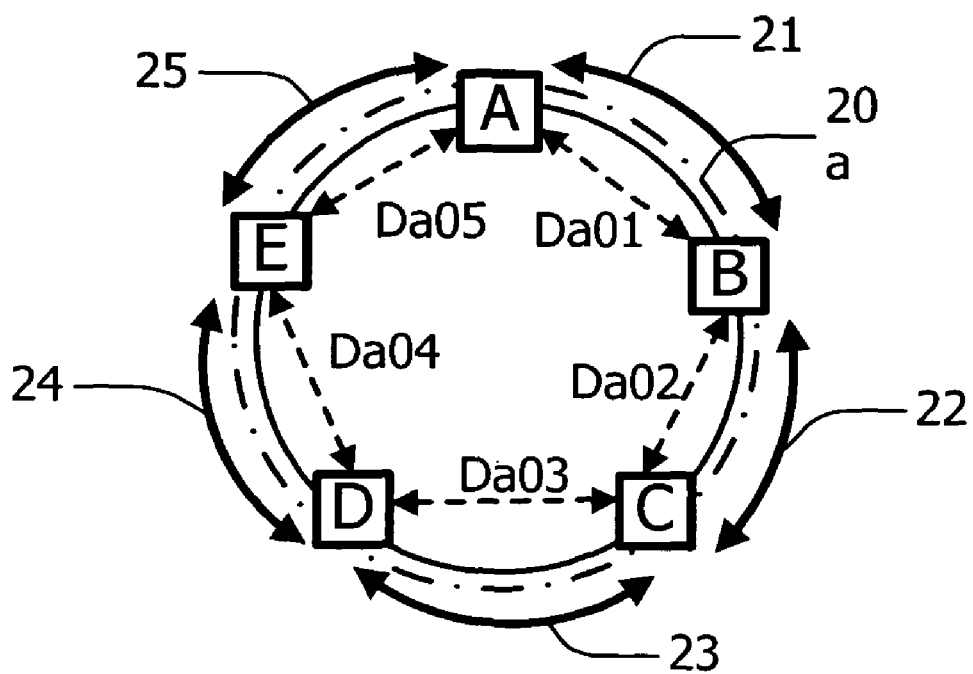

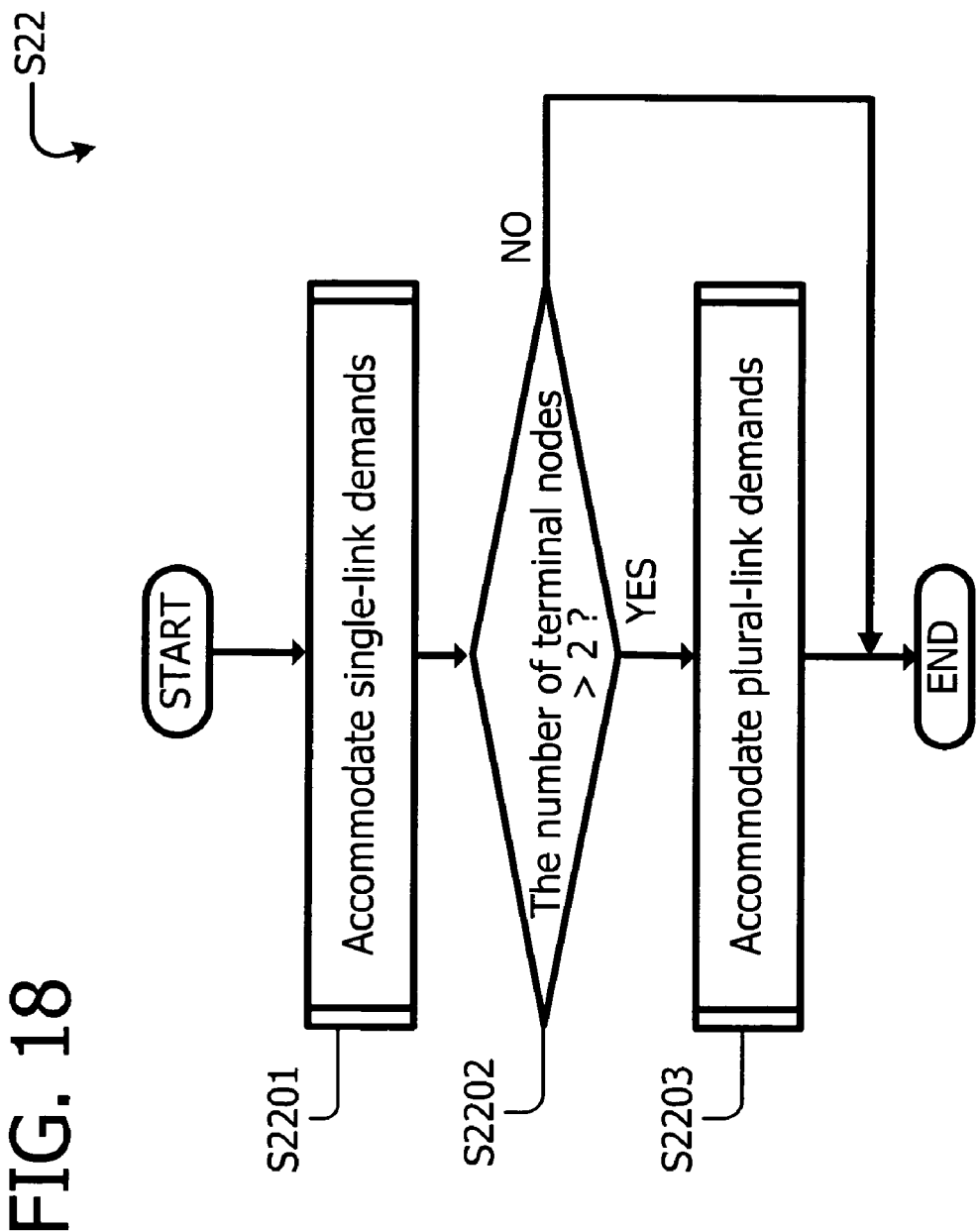

While there is at least one i($0 \leq i \leq n-1$) that satisfies a condition that IB(i,h)> 0 , IP(i,h) > 0, and generation of combination of demands between terminal nodes (i) and (i+h) has not been tried yet.

D0401 — For routes having idle band IB(i,h)>0 and the maximum number of idle communication ports IP(i,h), additional combination of demands having bandwidth not greater than IB (I,h) is generated and accommodated.

D0402 — Update IP(i,h), IB(i,h), IdleBW(i)-IdleBW(i+h-1), IdlePort(i), and IdlePort(i+h).

METHOD FOR ACCOMMODATING SIGNAL PATHS TO RING NETWORK

BACKGROUND OF THE INVENTION

1. Field of the Invention

The present invention relates to a method for designing a ring network, and particularly a method for efficiently accommodating paths of various client signals to a ring network in consideration of an arrangement order on the ring network of a route for accommodating client signal paths.

2. Description of the Related Art

Recently, an optical transmission/reception apparatus (generically called ADM on λ, ADM on a card, etc.), which has an Add/Drop function of a SONET signal and a SDH signal (simply "SONET/SDH" hereinafter) together with an optical signal transponder function (i.e., the function of generating a signal light), has been developed. A SONET signal is based on ANSI T1. 105 recommendation: Synchronous Optical Network Basic Description Including Multiplex Structures, Rates and Formats, and an SDH signal is based on ITU-T Recommendation G. 803: Architecture of Transport Networks Based on the Synchronous Digital Hierarchy).

The above mentioned optical transmission/reception apparatus enables a construction of an upper layer network accommodating diverse client signals including a SONET signal, SDH signal (simply "SONET/SDH" hereinafter), Ethernet (registered trademark) and fiber channel, on an optical network structured by a wavelength division multiplexing (WDM) system.

Embodiment of the present invention relates to a technological design for accommodating a client signal preferable to an SONET/SDH ring network constructed by using the above transponder apparatus. More particularly, the embodiment relates to SONET BLSR (Bidirectional Line Switched Ring), or SDH Multiplex Section Shared Protection Ring network. The SONET BLSR network will be explained as an example of a typical ring network.

Conventionally, when a ring network is designed on an optical network structured like a mesh network, each time one SONET BLSR network is designed, a ring route on the optical network is designed and the accommodation of a client signal to the ring route is performed. In this case, on the SONET BLSR ring, the arrangement order of a route for accommodating the client signal is taken into consideration so as to prevent the overlap of a communication route between terminal nodes as transmitting and receiving terminals of the client signal, thereby accommodating the client signal more efficiently. However, a sequential relationship between the routes for accommodating the client signal is not conventionally considered and this becomes one factor for reducing the accommodation efficiency.

Japanese Unexamined Patent Application Publication No. 2000-232472 discloses a technology for automatically designing a transmission route on a ring network. Further, PCT Japanese Translation Patent Publication No. 2003-520496 discloses a technology for designing the accommodation of a client signal.

Conventionally, on the ring networks, such as SONET BLSR ring, the arrangement order on the ring network of a communication route between terminal nodes as transmitting and receiving terminals of a client signal is not appropriately taken into consideration. This is one of the factors for obstructing accommodation efficiency of the client signal.

SUMMARY

According an aspect of an embodiment, there is provided a method for accommodating signal paths to a ring network. The method comprises: providing traffic demands each indicating a requirement for accommodating one or more signal paths to the ring network, each traffic demand of the demand set including a terminal node identifier and a link cost, the terminal node identifier pointing a pair of terminal nodes each being a transmitting and receiving end node of the one or more signal paths to be accommodated, the link cost indicating a cost for transferring traffic between the pair of terminal nodes; performing a demand chain generation procedure of generating a demand chain defined as a series of traffic demands in which each traffic demand shares one of the pair of terminal nodes pointed thereby with at least one adjacent traffic demand and the number of pairs of terminal nodes pointed by traffic demands in the series of traffic demands is maximized; corresponding each traffic demand of the demand chain to a demand accommodating route which is defined as the pair of terminal nodes pointed by the each traffic demand and a route therebetween arranged in a predetermined rotation direction on the ring network; generating a demand accommodating route chain defined as a sequence of demand accommodating routes arranged in the same order as the corresponding traffic demands of the demand chain wherein each demand accommodating route shares one of the pair of terminal nodes thereof with an adjacent demand accommodating route; and performing a demand accommodation procedure of accommodating signal paths required by traffic demands pointing a pair of terminal nodes both included in the demand accommodating route chain, to the demand accommodating route chain.

The above is only an example of an aspect of an embodiment. All embodiments are not limited to including all the features in this example.

BRIEF DESCRIPTION OF THE DRAWINGS

FIG. 4 is a diagram illustrating an example (2) for accommodating the traffic demands to the ring network.

FIG. 18 is a diagram illustrating the outline of an operation flow for accommodating traffic demands to a demand accommodating ring according to the embodiment.

FIG. 24 is a diagram illustrating an example (2) of an operation flow for accommodating plural-link demands according to the embodiment.

DESCRIPTION OF THE PREFERRED EMBODIMENTS

In the embodiment described hereafter, traffic demands are described as bidirectional traffic demands. Client signals requested by each traffic demand use a predetermined number of client ports in a transmitting and receiving apparatus depending on a protection method on the client side.

Figure 1A:
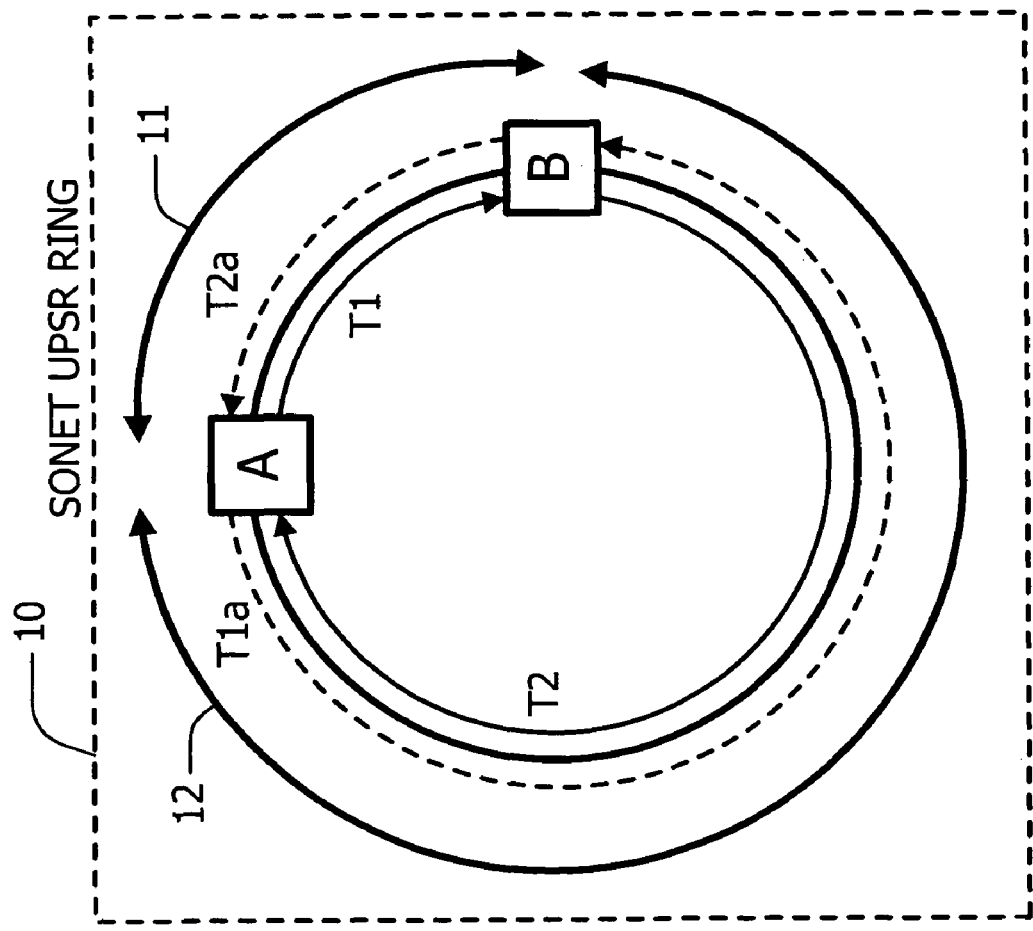
FIGS. 1A and 1B are diagrams illustrating the outline of protection of a ring network.
Figure 1B:
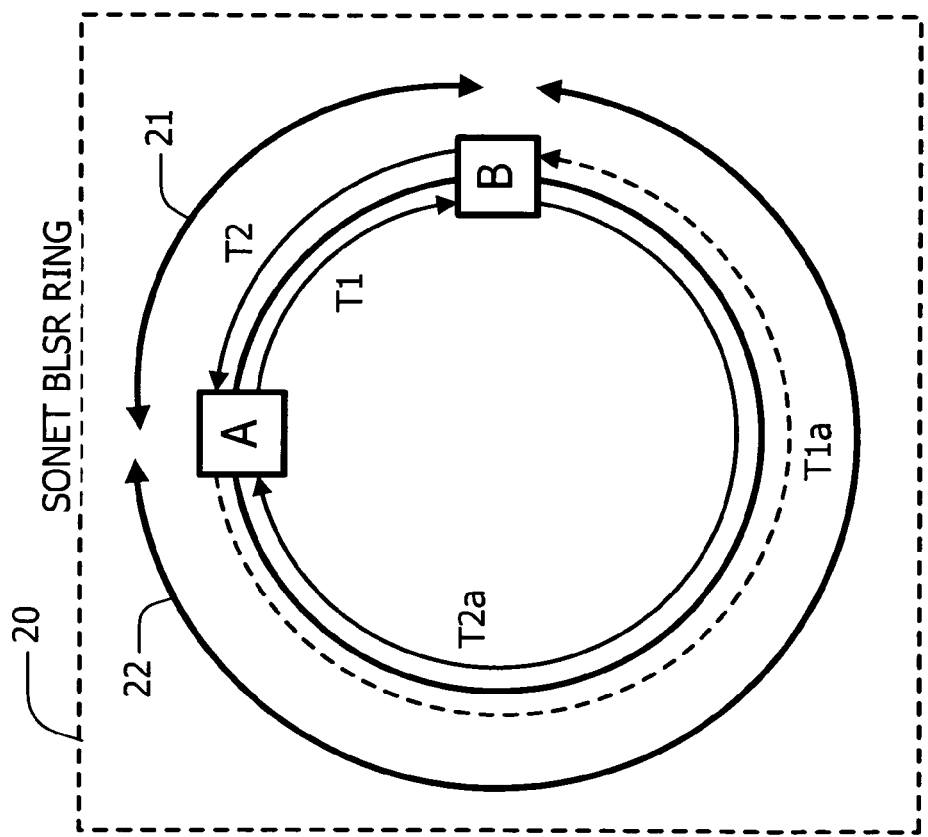

FIGS. 1A and 1B are diagrams illustrating the outline of protection of a ring network, comparing an SONET UPSR ring 10 (shown in FIG. 1A) with an SONET BLSR ring 20 (shown in FIG. 1B) as typical examples of the ring network. Herein, for a convenience of an explanation, a description will be given of a flow of traffic of client signals at two nodes A and B as representative terminal nodes, which are extracted from among terminal nodes on the ring network. In the subsequent description, as long as there is no special description, the nodes on the ring network are expressed by using alphabets.

Reference numeral 10 denotes an SONET UPSR ring in which each working traffic of transmission and reception between the two nodes on the ring travels in the same direction on the ring. For example, referring to FIG. 1A, reference alphanumeric T1 denotes the working traffic from the node A to the node B and reference alphanumeric T2 denotes the working traffic from the node B to the node A, and both the working traffic T1 and T2 travel in a clockwise direction on the ring through routes 11 and 12, respectively.

Further, protection traffic T1a and T2a, which correspond to the working traffic T1 and T2, respectively, always travel in the counterclockwise direction through the routes 12 and 11, respectively. At the time of a failure such as a cable cut, the nodes A and B use the protection traffic T1a and T2a as new working traffic in replacement of the original working traffic T1 and T2, respectively. Therefore, the traffic T1 and T2 which terminate at the nodes A and B require a ring route having the bandwidth obtained by adding the bandwidth for the traffic T1 and the bandwidth for the traffic T2.

The above explanation is given of the traffic upon paying attention to the two terminal nodes A and B on the SONET UPSR ring network 10. However, the same may be described of the traffic traveling between a pair of other arbitrary terminal nodes on the SONET UPSR ring network 10. Therefore, a bandwidth of the entire ring required for transferring traffic between all pairs of the terminal nodes accommodated is obtained by totaling the bandwidth required for the traffic between each pair of the terminal nodes.

On the other hand, on an SONET BLSR ring 20 shown in FIG. 1B, working traffic T1 and T2 between terminal nodes A and B travel through only a predetermined route 21 between nodes A and B on the ring network 20. When route 21 is normal, unlike the SONET UPSR ring, there are no protection traffic traveling in the opposite direction on ring network 20. Therefore, on the SONET BLSR ring 20, working traffic between terminal nodes A and B can travel on predetermined route 21 while another working traffic travel on route 22 on the opposite side of route 21.

On the SONET BLSR ring 20, a working traffic uses the half of all the bandwidth of the SONET BLSR ring 20, and the remaining half bandwidth is used for protection. At the time of the failure of the route 21, the original working traffic T1 and T2 travel as the traffic T1a and T2a by using the bandwidth for protection held in the route 22 on the opposite side of the route 21 on the ring.

Although the traffic is explained above by paying attention to the two terminal nodes A and B on the ring network 20, the same may be described of the traffic between two other arbitrary terminal nodes on the ring network 20.

Accordingly, as long as a plurality of routes on which working traffic travels are not overlapped, the plurality of working traffic can simultaneously travel on the plurality of nonoverlapping routes. As a result, different client signals can be efficiently accommodated to the same ring network. Further, at the time of a failure on a predetermined route between the terminal nodes, the traffic that usually travels within the predetermined route can travel on the route on the opposite side of the predetermined route on the ring by using the bandwidth for protection.

Figure 2:
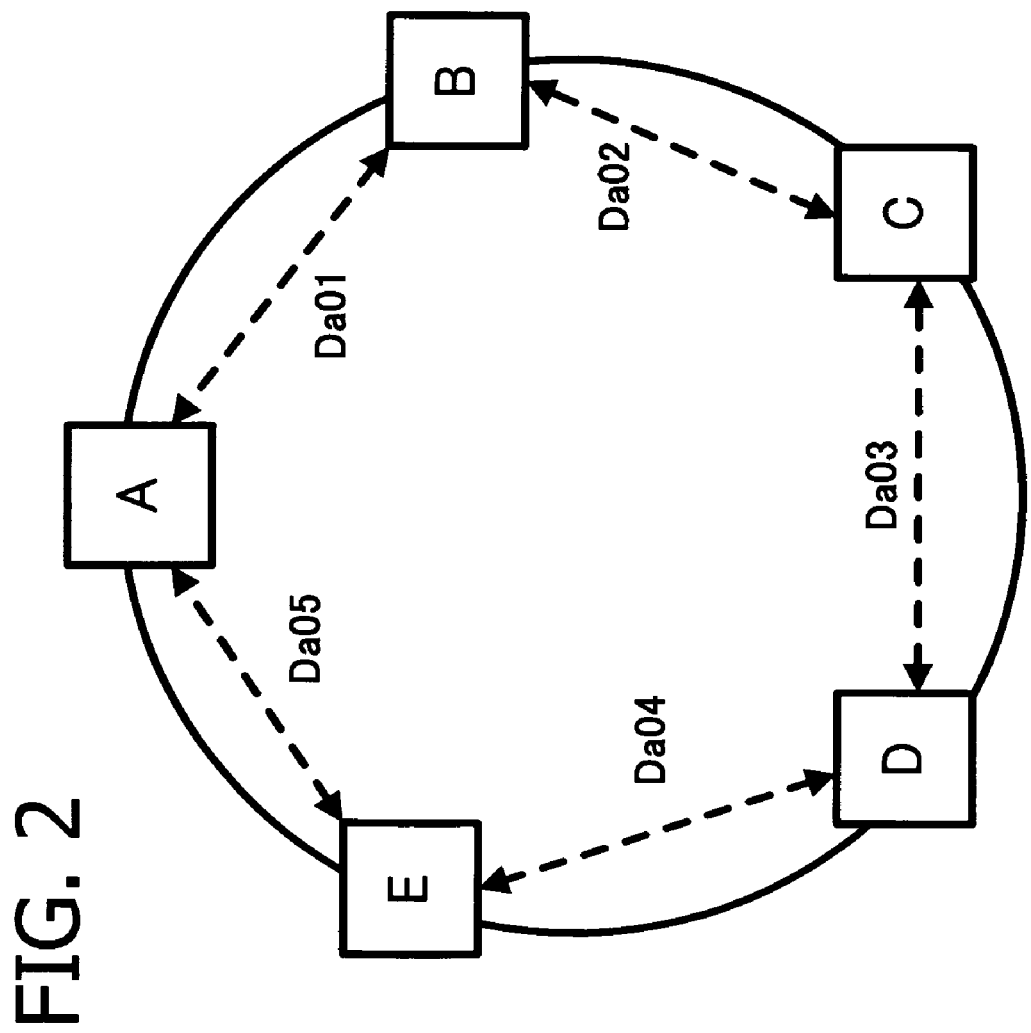
FIG. 2 is a diagram illustrating an example (1) of traffic demands on the ring network.

FIG. 2 is a diagram illustrating an example (1) of traffic demands on the ring network.

Herein, dotted lines with bidirectional arrows denote traffic demands for client signals terminating at a pair of nodes selected among five terminal nodes A, B, C, D, and E on the ring network.

A traffic demand (hereinafter, "a traffic demand" can be abbreviated as "a demand"), which is a requirement for accommodating client signal paths to the network, can be, for example, expressed as identifiers of two terminal nodes between which the bidirectional traffic of the client signal is transferred and a link cost between the two terminal nodes. The link cost can be, for example, a bandwidth required for traffic between the two terminal nodes, and the number of communication ports required for traffic between the two terminal nodes.

Here, a demand is a requirement for accommodating client signal paths provisioned between the two terminal nodes, and a route on the ring network for actually transmitting the traffic of the client signal is not specified by the demand. Therefore, in order to efficiently accommodate client signal paths required by demands to the ring network, it is necessary to design the ring network by efficiently correlating the traffic required by the demands with routes on the ring network which actually transmit the required traffic. Hereinafter, "accommodate client signal paths required by a demand" can be abbreviated as "accommodate a demand".

Herein, the demand is shown by a dotted line with bidirectional arrows, and an example is given of the case of giving demands Da01 to Da05 to pairs of the terminal nodes indicated by the dotted lines with bidirectional arrows, respectively. In this case, each of the demands has, as a link cost, a bandwidth equal to two OC48 client signals. Further, the bandwidth of the ring network is assumed as OC192. In the case, the bandwidth available for working traffic required by demands on a route of one OC192 SONET UPSR ring is equal to that of four OC48 signals, whereas the bandwidth available for working traffic requited by demands on a route of one OC192 SONET BLSR ring is equal to that of two OC48 signals since half the bandwidth of the OC192 SONET BLSR is used for protection.

Figure 3:
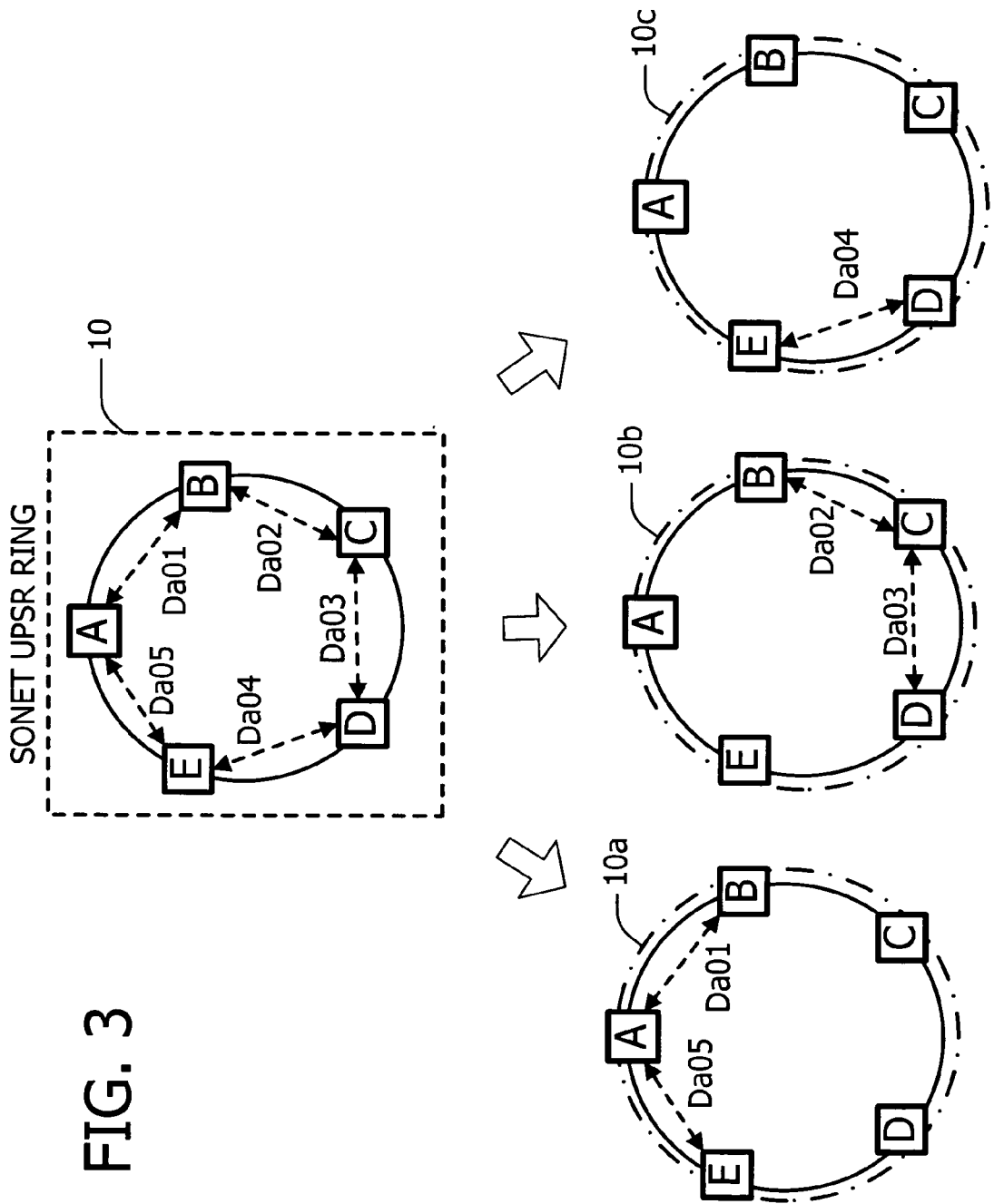
FIG. 3 is a diagram illustrating an example (1) for accommodating the traffic demands to the ring network.

FIG. 3 is a diagram illustrating an example (1) for accommodating the traffic demands to the ring network, where the demands shown in FIG. 2 are accommodated to the SONET UPSR ring.

First, since the link cost (in the case, bandwidth) of the demand Da01 is OC48×2, accommodation of the demand Da01 to the SONET UPSR ring requires a ring route with a bandwidth equal to "OC48×2" for working and protection traffic.

Similarly, since each of the link costs (bandwidths) of the demand Da02, Da03, Da04, and Da05 is "OC48×2", accommodation of all the demands Da01 to Da05 requires a bandwidth equal to the total OC48×10, i.e., ten signals of OC48. Therefore, in the case of using a SONET UPSR ring with the bandwidth of OC192, the total of three SONET UPSR rings is needed.

In the case shown in FIG. 3, the demands Da01, Da02, Da03, Da04, and Da05 are divided and accommodated to three OC192 SONET UPSR rings each having a bandwidth of OC192. That is, the demands Da01 and Da05 are accommodated to a ring 10a of OC192, the demands Da03 and Da04 are accommodated to a ring 10b of OC192, and the demand Da04 is accommodated to a ring 10c of OC192.

As mentioned above, in the case of a SONET UPSR ring, the accommodation of the demands Da01, Da02, Da03, Da04, and Da05 requires three OC192 SONET UPSR rings.

FIG. 4 is a diagram illustrating an example (2) for accommodating demands to the ring network, where the demands shown in FIG. 2 are accommodated to a SONET BLSR ring.

In the case of a SONET BLSR ring, as explained above with reference to FIG. 1B, by determining a route for transmitting traffic between the two terminal nodes pointed by the demand (hereinafter, can be also expressed as "demand terminal nodes"), that is, by determining a route for accommodating the demand, (hereinafter, expressed as "a demand accommodating route"), traffic between the demand terminal nodes travels within the route for accommodating the demand under normal condition. Therefore, traffic required by another demand can travel in another route on the opposite side of the route for accommodating the demand on the SONET BLSR ring. Since the routes 21, 22, 23, 24, and 25 do not overlap each other, the client signals each having a bandwidth of OC48×2=OC96, which are requested by the demands Da01, Da02, Da03, Da04, and Da05, can be accommodated to the routes 21, 22, 23, 24, and 25, respectively. As a result, all the demands Da01, Da02, Da03, Da04, and Da05 can be accommodated to one SONET BLSR ring with a bandwidth of OC192.

As described above with reference to FIGS. 3 and 4, in the case of accommodating demands to a SONET UPSR ring shown in FIG. 3, although it is not necessary to take into consideration the relationship between the routes, the accommodation efficiency of the demand is low. On the other hand, in the case of a SONET BLSR ring, demands can be accommodated more efficiently by taking into consideration a relationship between routes for accommodating the demands (order, overlap situation, etc.), that is, the arrangement order of the pairs of terminal nodes pointed by the demands on the ring route.

Figure 5:
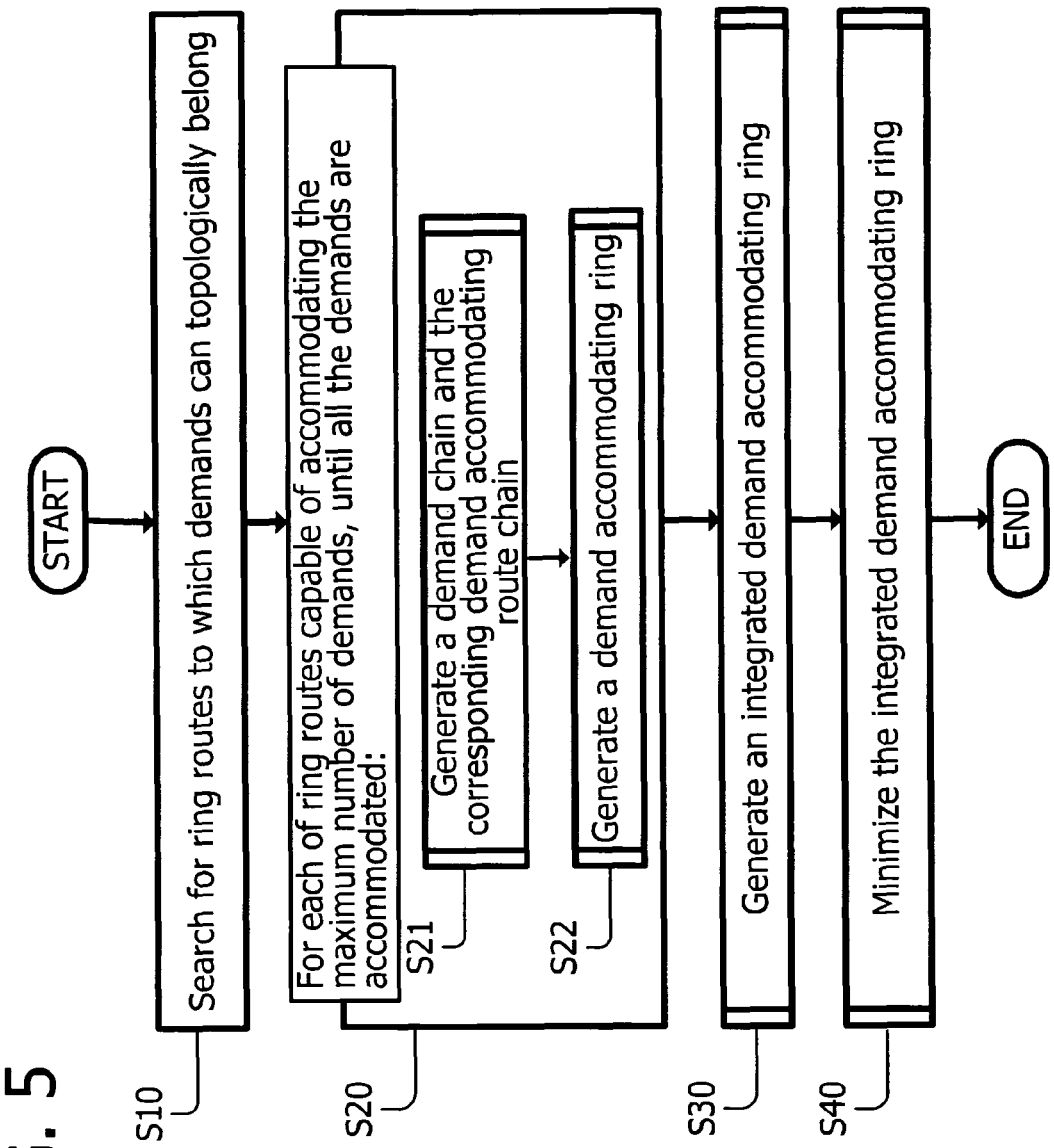
FIG. 5 is a diagram illustrating the outline of a method for designing a ring network according to the embodiment.

FIG. 5 is a diagram illustrating the outline of a method for designing a ring network according to the embodiment. The method can be embodied, for example, in the following procedure.

In step S10, for given demands, a plurality of ring routes which can accommodate the given demands are searched for on a network topology which is given in advance so that each of the client signals required by the given demands can be accommodated to at least one of the ring routes obtained here. The ring route can be obtained, for example, by a method described in Japanese Patent Application No. 2006-165008.

In step S20, among a plurality of ring routes searched for in step S10 as mentioned above, the ring route to which the maximum number of demands can topologically belong is selected, and the following demand accommodating process of steps S21 to S22 is performed on the basis of the selected ring route so as to accommodate the above maximum number of demands to a ring network (herein after, expressed as "a demand accommodating ring").

Next, for remaining demands which cannot be accommodated to the above demand accommodating ring, a ring route to which the maximum number of the remaining demands can topologically belong is further selected from among the plurality of ring routes searched in step S10, as a next ring route to be processed. Then, the following process of steps S21 to S22 is performed on the basis of the next ring route selected above so as to accommodate the remaining demands to another demand accommodating ring. This processing is repeated until all the demands to be accommodated are accommodated to one or more demand accommodating rings.

In step S21, from among demands that remain without accommodation and can be accommodated to a ring route to which the maximum number of demands can topologically belong, a series of demands satisfying a predetermined conditions is generated as "a demand chain". Next, each of the demands included in the generated demand chain is correlated with a route capable of accommodating the each demand, which is hereinafter expressed as "a demand accommodating route".

Here, demand accommodating routes are correlated with demands so that the demand accommodating routes are adjacent each other without mutual overlap on the ring route, that is, so that two adjacent demand accommodating routes share one of the end nodes thereof. Further, the demand accommodating routes are correlated with the demands so that the number of the demand accommodating routes becomes maximum, in other words, the number of pairs of terminal nodes pointed by demands included in the demand chain becomes maximum. As a result, a sequence of connected demand accommodating routes is generated as "a demand accommodating route chain". However, there exists the restriction that the number of terminal nodes is "16" at the maximum level in the case of a SONET BLSR ring. Accordingly, in the case of a large number of terminal nodes existing on the ring route, the restrictions must be considered.

As described above, for a demand chain, a demand accommodating route chain is generated so that demands in the demand chain one-to-one correspond to routes in the demand accommodating route chain, respectively, in a predetermined rotation direction on the ring route.

Conditions selecting a series of demands for generating a demand chain are shown in order of higher priority thereof.

(Condition 1) A series of demands has a larger number of pairs of demand terminal nodes included therein.

(Condition 2) A series of demands has a smaller number of terminal nodes included therein (Condition 3) A series of demands has a larger total of link costs included therein.

The priority is first given to (Condition 1) among the above-mentioned conditions. When there exist a plurality of series of demands that satisfy (Condition 1), the series of demands that satisfy (Condition 2) is selected from among the plurality of series of demands that satisfy (Condition 1). Further, when there exist a plurality of series of demands that satisfy (Conditions 1 and 2), the series of demands that satisfy (Condition 3) is selected from among the plurality of series of demands that satisfy (Conditions 1 and 2).

In step S22, a ring route having a predetermined bandwidth and including the demand accommodating route chain generated in step S21 is set as a demand accommodating ring (for example, one OC192 SONET ring). Demands pointing a pair of terminal nodes both included in the demand accommodating ring are accommodated to the demand accommodating ring.

Thus, it is possible to accommodate demands in consideration of the arrangement order of the pairs of terminal nodes on the ring route. In addition to the arrangement order on the ring route, accommodation of demands can be done in consideration of the number of communication ports for client signals included in the terminal nodes, as described later.

In step S30, when there are a plurality of demand accommodating rings that are generated in step S20, some of the demand accommodating rings are multiplexed and integrated into an integrated demand accommodating ring. Like step S22, in addition to consideration of the number of communication ports for the client signals at the terminal node, the arrangement order of the pairs of demand terminal nodes on the integrated demand accommodating ring is taken into consideration as described later. In some cases, a plurality of integrated demand accommodating rings can be generated.

In step S40, the route of the integrated demand accommodating ring generated in steps up to step S30 is minimized if needed. For example, resources needed for the entire network can be minimized by setting the route between the pair of adjacent terminal nodes as the shortest distance route or the minimum hop route.

Figure 6:
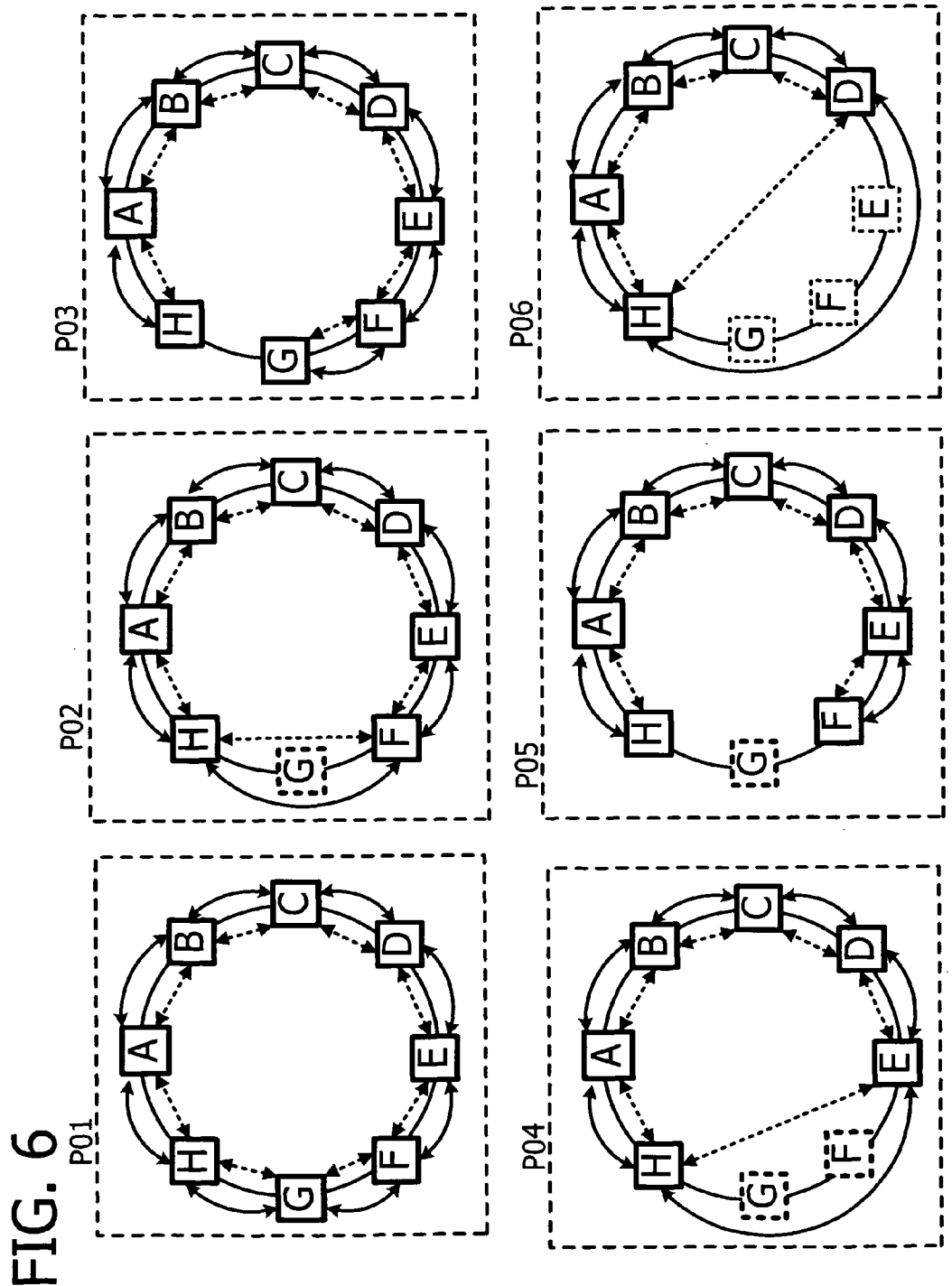
FIG. 6 is a diagram illustrating an example of a procedure for generating a series of demands.

FIG. 6 is a diagram illustrating an example of a procedure for generating a series of demands, where a series of demands is selected under (Condition 1) and (Condition 2) described above so as to generate a demand chain and a demand accommodating route chain in the case that there exist eight terminal nodes on the ring network.

In FIG. 6, a plurality of patterns of series of demands are arranged in the order of priority of selection from a higher one to a lower one, that is, in the order of P01, P02, P03, P04, P05, P06, P07, and P08. A demand is denoted by a dotted line with bidirectional arrows which is correlated with a pair of demand terminal nodes. Further, a route for accommodating a demand is denoted by a solid line with bidirectional arrows in association with the demand denoted by a dotted line with bidirectional arrows.

In order to generate a demand chain and the corresponding demand accommodating route chain, first, a series of demands are selected depending on (Condition 1): "A series of demands has a larger number of pairs of demand terminal nodes." In the example, if there are a series of demands having 8 pairs of the demand terminal nodes as shown by P01, the series of demand shown by P01 is determined as the demand chain to be generated.

If a series of demands like P01 does not exist, next a series of demands having 7 pairs of demand terminal nodes checked. In the case, there are two series of demands having 7 pairs of demand terminal nodes as shown by P02 and P03. Therefore, a series of demands is selected under (Condition 2): "A series of demands has a smaller number of terminal nodes." In the case, a closed series of demands shown by P02 is determined as the demand chain to be generated because the closed series of demands shown by P02, which do not include a node G (represented by a dotted line frame) as a terminal node, has a smaller number of terminal nodes than a open series of demands shown by P03. Therefore, the number of transmitting and receiving equipments needed for the terminal nodes decreases in the case of P02 than P03. As described above, it is checked whether a series of demands satisfy (condition 1) and (condition 2) or not. In the case, a plurality of patterns of series of demands shown by P01 to P06 are selected in the order of from P01 to P06, and the series of demands selected first is determined as the demand chain.

For a given demand, if there is no different demands that share the demand terminal node with the given demand, series of demands including only two demand terminal nodes pointed by the given demand is determined as the demand chain.

In the example shown in FIG. 6, the demand chain is determined on the basis of (Condition 1) and (Condition 2). If there are a plurality of series of demands satisfying (Condition 1) and (Condition 2), a series of demand further satisfying (Condition 3): "A series of demands has a larger total of link costs included therein." is selected from the plurality of demands satisfying (Condition 1) and (Condition 2), and the selected series of demands is determined as the demand chain.

In the case shown by FIG. 6, the number of nodes on the ring route is 8. In the case that the number of nodes on the ring route is 16 or more on the SONET BLSR ring, a closed series of demands having 16 nodes, a closed series of demands having 15 nodes, and an opened series of demands having 16 nodes correspond to P01, P02, and P03 in FIG. 6, respectively.

In accordance with a demand chain generated as described above, a demand accommodating route chain for accommodating demands included in the demand chain is generated, as shown by a solid line with bidirectional arrows in association with the demand denoted by a dotted line with bidirectional arrows in FIG. 6. We define a demand accommodating ring as a ring having a predetermined bandwidth and including the demand accommodating route chain. A SONET BLSR ring of OC192 is an example of a demand accommodating ring. As will be described later with reference to FIGS. 17A and 17B, demands pointing adjacent terminal nodes are first accommodated preferentially to the demand accommodating ring. Next, other demands, which are not included in the demand chain but point pairs of terminal nodes included in the demand accommodating ring, are accommodated to the demand accommodating ring, thereby designing the demand accommodating ring with high accommodation efficiency.

Next, a description will be given of a method for generating a demand chain with reference to FIGS. 7 to 13.

Figure 7:
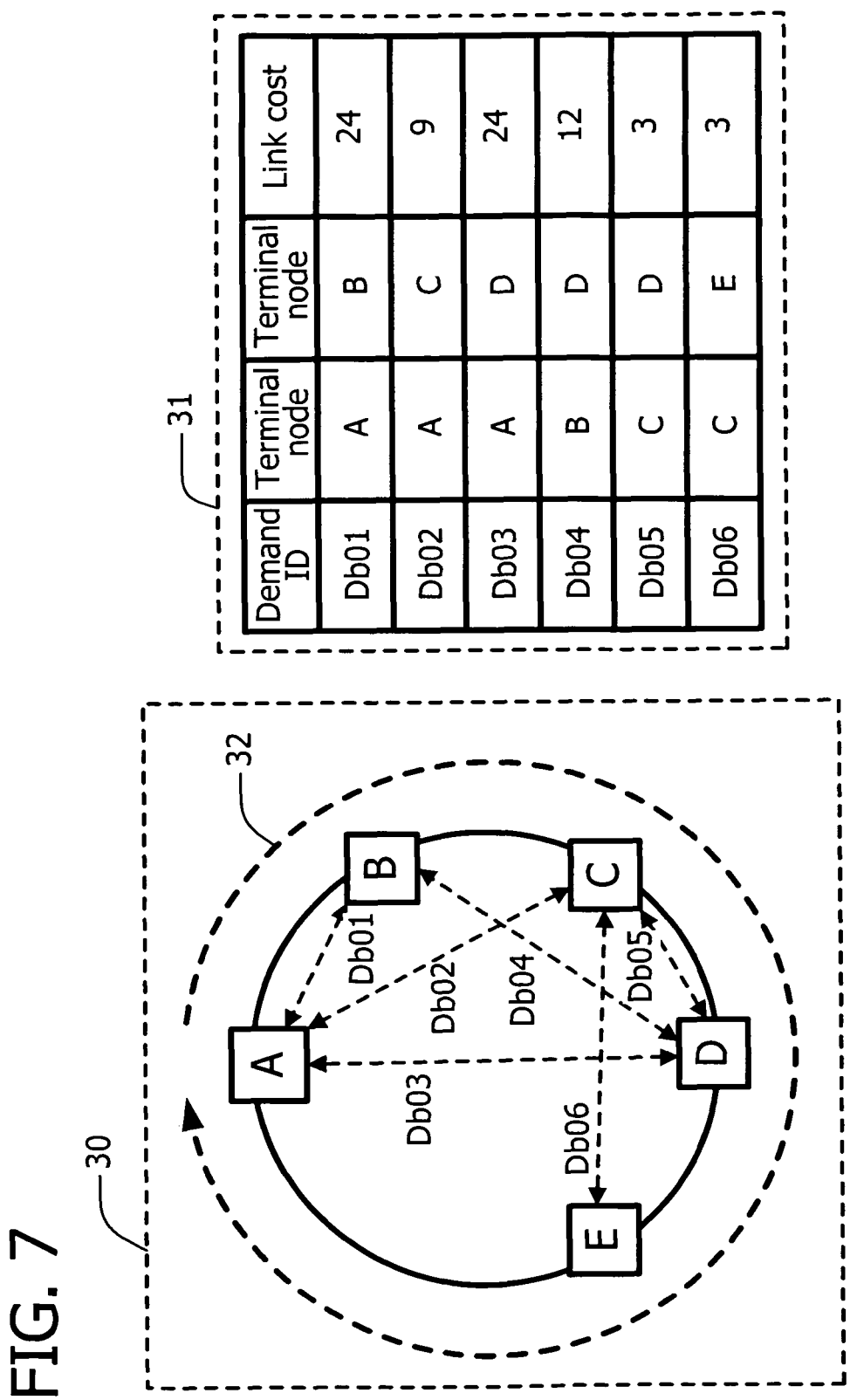
FIG. 7 is a diagram illustrating an example (2) of the traffic demands on the ring network.

FIG. 7 is a diagram illustrating an example (2) of the traffic demands on the ring network.

In the example, terminal nodes A, B, C, D, and E are arranged on a ring network 30, and a node that is not the terminal node is not shown. Dotted lines Db01, Db02, Db03, Db04, Db05, and Db06 with bidirectional arrows denote demands pointing nodes indicated by the arrows as the demand terminal nodes.

Reference numeral 31 is a demand list in which each entry denotes a demand to be accommodated to the ring network 30. Each entry of the demand list includes identifiers identifying two demand terminal nodes pointed by the demand and a link cost assigned to the link between the two demand terminal nodes. The link cost can be, for example, a bandwidth of traffic transferred between the demand terminal nodes.

Reference numeral 32 denotes an example of a search direction of the terminal node when generating the demand chain. In the case, searching is performed in the clockwise direction, that is, in the order of the node A, B, C, D, E, and A. The search direction can also be the counterclockwise direction.

The following description with reference to FIGS. 8 to 12 will be done by using, as an example, the ring network 30 and the demand list 31 shown in FIG. 7.

Figure 8:
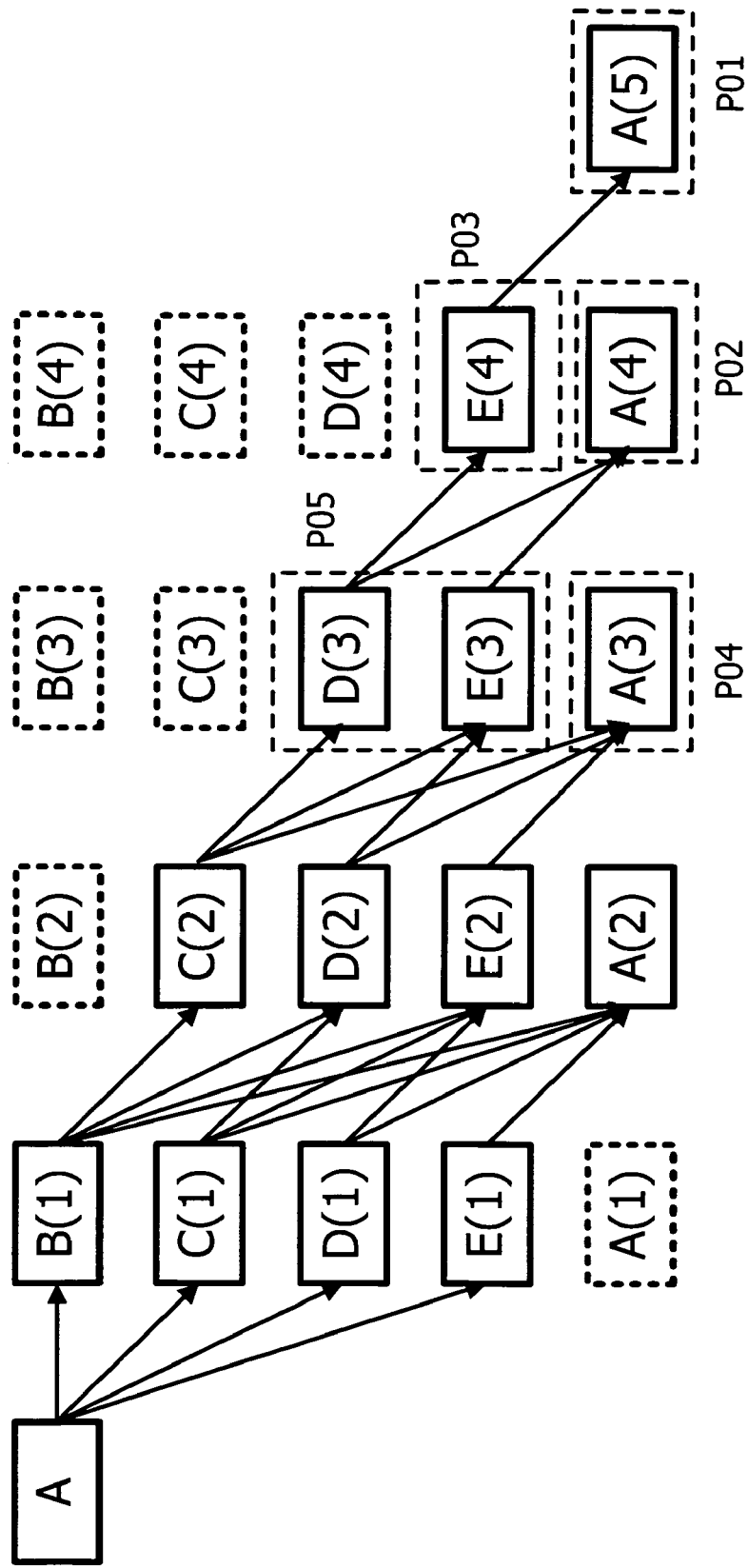
FIG. 8 is a diagram illustrating an example (1) of a procedure for generating a demand chain according to the embodiment.

FIG. 8 is a diagram illustrating an example (1) of a procedure for generating a demand chain according to the embodiment. In FIG. 8, by using as a representative example the ring network 30 and the demand list 31 shown in FIG. 7, all the possible cases of searching terminal nodes in a predetermined direction that can be caused in order to generate a demand chain are depicted in the form of a combinations of arrows each indicating a hop which is defined as a transition of search between two terminal nodes. Hereafter, an arrow also can be expressed as "a hop". Although the predetermined direction can be clockwise or counter-clockwise, in the case, the clockwise direction is used for a convenience of explanation.

First of all, the start node is determined and a graph shown in FIG. 8 is formed. Here, a terminal node pointed by the largest number of demands each pointing different pair of terminal nodes, that is, a terminal node most frequently pointed by demands pointing different pairs of terminal nodes, is determined as the start node. Note that even if a terminal node is pointed a plurality of times by the demand pointing the same pair of terminal nodes, the terminal node is considered to be pointed only one time.

In the case, it is assumed that the demands shown in the demand list 31 of FIG. 7 is given to the ring network 30. Here, the number of demands pointing the terminal node A is 3, which is the maximum in the demand list 31. Therefore, the node A is determined as the start node.

In a diagram shown in FIG. 8, terminal nodes reached by one search (or one hop) are arranged perpendicularly in line whereas each line of reached terminal nodes is arranged rightward successively for every number of times of search (or number of hops). A numerical value in a parenthesis appended to a node identification symbol (alphabet) represents the number of times of search (the number of hops) until reaching the node. Herein, the terminal nodes reached by one search (or one hop) are arranged perpendicularly in line, in the order of reaching in the clockwise direction starting from the node A (a start node) on the ring route. The number of times of search (or the number of hops) means the number of pairs of demand terminal nodes searched up to then in the series of demands. Therefore, in the case of the SONET BLSR ring network, the maximum number of times of search (or the maximum number of hops) becomes "min[16, N]" where N is the number of terminal nodes on the ring route.

For example, D(2) represents a state in which the node D is reached by two hops via the node B or C from the start node A, and the demand Db01 (pointing the pair of terminal nodes A and B) and the demand Db04 (pointing the pair of terminal nodes B and D) shown in FIG. 7 are chained as a series of demands.

In FIG. 8, arrows represent a predetermined direction of search (for example, clockwise direction) on the ring route, and are given to all the possible reachable terminal nodes pointed by demands.

In order to allow a closed series of demands, for a demand pointing the start node (for example, node A) as one of the pair of terminal nodes, the arrow from the other one of the pair of terminal nodes to the start node is allowed. In addition, directions indicated by arrows bear no relation to the signal direction required by the actual demands. Reference alphanumeric P01 to P05 in FIG. 8, which are appended to the last reached node, represent patterns of a series of demands shown in FIG. 6. Here, the series of demands obtained by searching from A to A (5) is the pattern P01 having the highest priority, and the priorities become lower in the order of P02, P03, P04, and P05.

Figure 9:
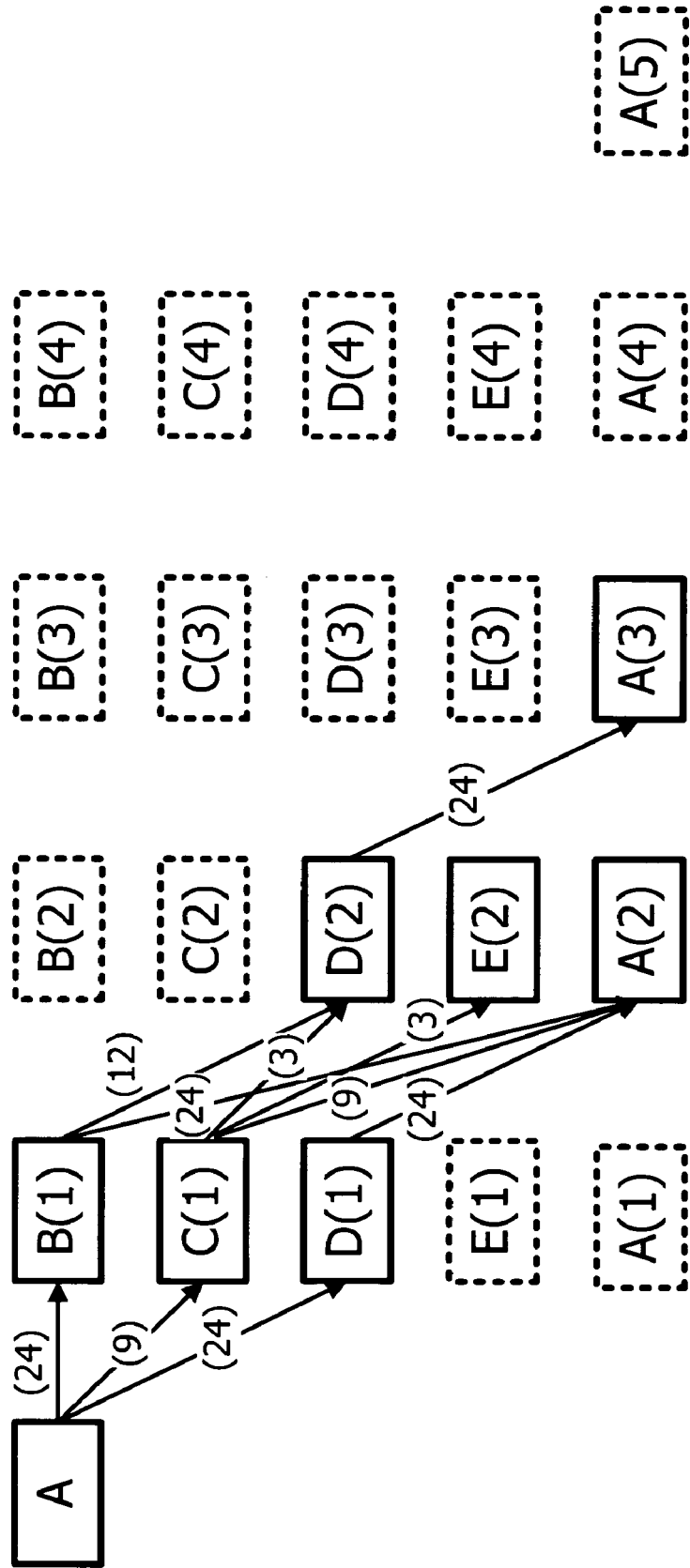
FIG. 9 is a diagram illustrating an example (2) of a procedure for generating a demand chain according to the embodiment.

FIG. 9 is a diagram illustrating an example (2) of a procedure for generating a demand chain according to the embodiment, where a procedure for searching for the series of demands while calculating the maximum total link cost of the series of demands is described. Herein, the link cost shown in the demand list 31 in FIG. 7 is used.

After depicting the graph as shown in FIG. 8, the optimal link between the terminal nodes in the series of demands is determined so that the sum of link costs totaled from the start node to the currently searched node becomes maximum. Thereby, the maximum amount of demands can be accommodated to a demand chain to be generated. Here, the link (arrow) is not depicted between the nodes that are not pointed by any demands.

In the following description, for a convenience of explanation, $C_i(p)$ (where i=A, B, C, D, and E, p=1, 2, . . . , min[16, N]) denotes the maximum total link cost at the reached time to a node i with p hops, and cost(i, j) denotes the total link cost between nodes i and j. Here, the link cost will be explained as the total bandwidth required by demands pointing the nodes i and j as the pair of terminal nodes. However, the link cost can be set as the number of demands pointing the nodes i and j as the pair of terminal nodes or the total number of ports required by demands pointing the nodes i and j as the pair of terminal nodes.

First, as shown in the demand list 31 in FIG. 7, demands Db01, Db02, and Db03 are sharing the start node A as one of the pair of terminal node thereof and also pointing nodes B, C, and D, respectively, as the other one of the pair of terminal node. In the case, $C_B(1)=24$, $C_C(1)=9$, and $C_D(1)=24$ are obtained. Since demands between the node A and E do not exist, links corresponding thereto do not exist, and $C_E(1)$ cannot be calculated. Further, since demands between the node A and the node A can not exist, similarly $C_A(1)$ cannot be calculated.

Subsequently, a route reaching the node via two pairs of terminal nodes pointed by two demands, that is, a route reaching the node by two hops (links) is searched. Routes reaching B(2) and C(2) do not exist. An input to D(2) is through the link from B(1) and C(1). The link cost of the demand (Db04), which points the nodes B and D as terminal nodes, is "12". The link cost of the demand (Db05), which points the nodes C and D as terminal nodes, is "3".

Therefore, cost(B, D)=12 and cost(C, D)=3 are obtained, and the maximum total cost up to D(2) is given below.

$$C_D(2) = \max[C_B(1) + \text{cost}(B, D), C_C(1) + \text{cost}(C, D)]$$
$$= \max[24 + 12, 9 + 3]$$
$$= \max[36, 12]$$
$$= 36$$

Similarly, the following is obtained.

$C_E(2)=C_C(1)+\text{cost}(C,E)=9+3=12$

Further, there are input links to A (2) from B(1), C(1), and D(1). Therefore, the following is obtained.

$C_A(2)=\max[C_B(1)+\text{cost}(C,A),C_C(1)+\text{cost}(C,A),C_D(1)+\text{cost}(D,A)]=\max[24+24,9+9,24+24]=\max[48,18,48]=48$ In this case, since the total link costs of both routes from B(1) to A(2) and from C(1) to A(2) are equivalent ("48"), any one of links from B(1) and C(1) may be selected. Herein, for example, B(1) can be selected.

Here, since the demand (Db03) points the start node A as one of the pair of terminal nodes, the arrow from the node D to the start node A is allowed.

Therefore, the following is obtained.

$C_A(3)=C_D(2)+\text{cost}(D,A)=36+24=60$

Since there are no further links to another node left, A(3) becomes the reached node. That is, for the demands given in FIG. 7, two series of demands comprising Db01-Db04-Db03 and Db02-Db05-Db03 are obtained as the series of demands having the maximum number of pairs of demand terminal nodes. Hereinafter, a series of the demands having the maximum number of pairs of demand terminal nodes is expressed as "a demand chain". In the case, two demand chains having the maximum number of pairs of demand terminal nodes are obtained.

Figure 10:
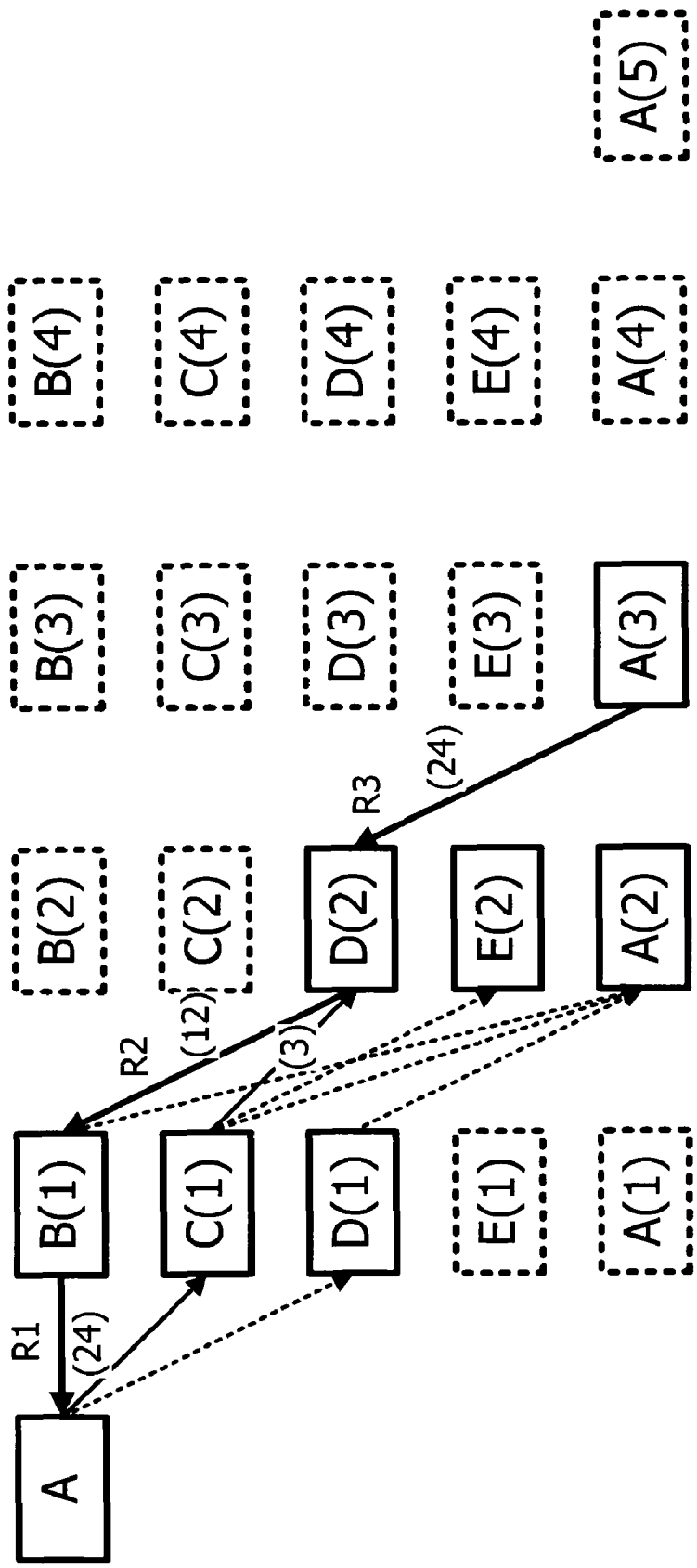
FIG. 10 is a diagram illustrating an example (3) of a procedure for generating a demand chain according to the embodiment.

FIG. 10 is a diagram illustrating an example (3) of a procedure for generating a demand chain according to the embodiment, showing a method for generating a demand accommodating route chain for accommodating the demands included in the demand chain.

By tracking back links R1, R2, and R3 in FIG. 10 from A(3) (the last reached node in FIG. 9) in the direction opposite to the predetermined node searching direction, the sequence of routes capable of accommodating the demand chain can be obtained.

In an example of FIG. 10, a link from A (3) to D (2) is first tracked in the opposite direction. Next, since there are two links from D(2) to B(1) or C(1), a link having the maximum cost $C_D(2)$ obtained in FIG. 9, that is, a link between D(2) and B(1) is selected. Finally, a link between B(1) and the start node A is selected.

As a result, a sequence of terminal nodes A(3)-D(2)-B(1)-A is obtained, and is made reverse in the order of the original node searching (forward direction), thereby obtaining a sequence of terminal nodes A-B-D-A, and the corresponding demand chain (Db01-Db04-Db03) having the maximum total link cost. Herein after, a demand chain having the maximum total link cost is expressed as "a maximum cost demand chain".

As will be described with reference to FIG. 11, corresponding to the maximum cost demand chain Db01-Db04-Db03, it is possible to obtain a sequence of demand accommodating routes including three pairs of terminal nodes (that is, including three terminal nodes A, B, D). Hereinafter, the sequence of demand accommodating routes corresponding to the maximum cost demand chain is expressed as "the demand accommodating route chain". In this case, the demand accommodating route chain obtained is a closed chain, and the node D which is reached at one hop before the last reached node A is determined as the final node of the maximum cost demand chain.

In another case, for example, if it is assumed that the reached node A(2) is obtained by demands different from the demands shown in FIG. 7, a link train A(2)-B(1)-A in the opposite direction can be obtained, and a sequence of demand accommodating routes A-B-A may be obtained in the forward direction as a demand accommodating route chain, and the node B becomes the final node in the case.

Figure 11:
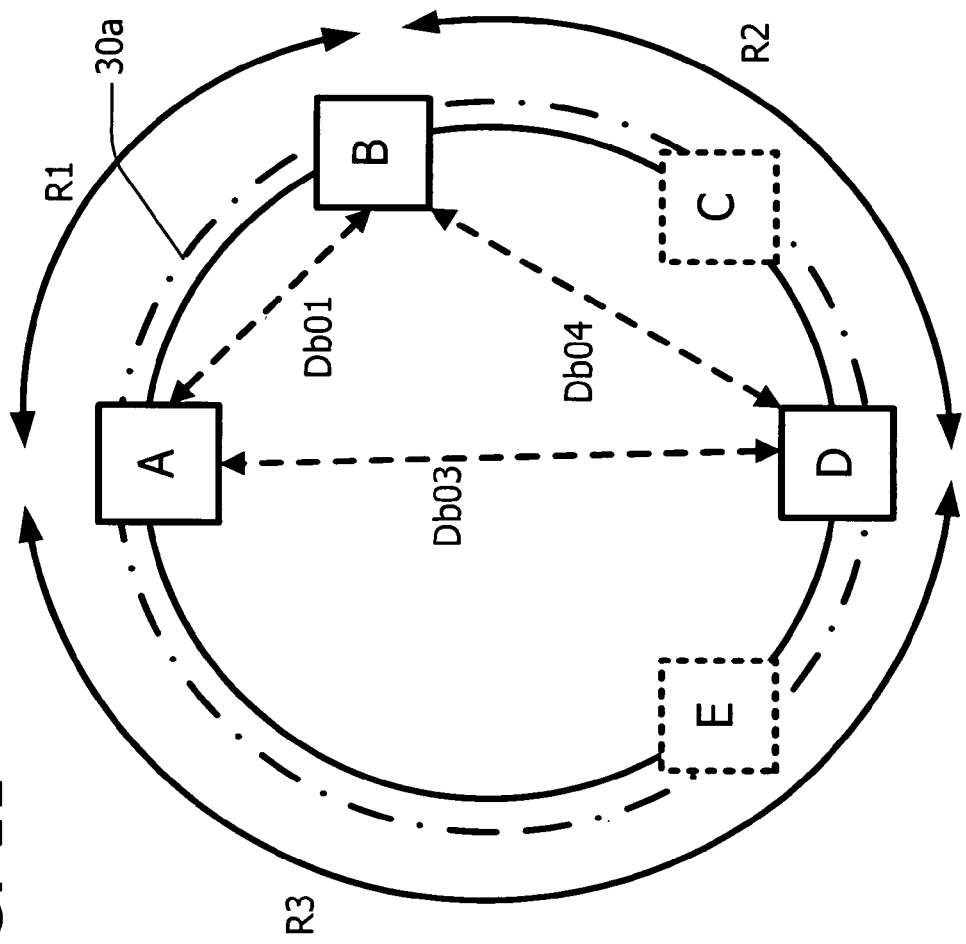
FIG. 11 is a diagram illustrating an example (4) of a procedure for generating a demand chain according to the embodiment.

FIG. 11 is a diagram illustrating an example (4) of a procedure for generating a demand chain according to the embodiment, where the maximum cost demand chain obtained by the procedure shown in FIGS. 8 to 10 and the demand accommodating route chain corresponding thereto are depicted. That is, the drawing shows the maximum cost demand chain Db01-Db04-Db03, and the demand accommodating route chain R1-R2-R3 corresponding thereto. In the case, ring 30a having a predetermined bandwidth and including a demand accommodating route chain R1-R2-R3 is determined as a demand accommodating ring, and the client signals required by the demands Db01, Db04, and Db03 included in the maximum cost demand chain Db01-Db04-Db03 can be accommodated to the ring 30a. Here, since the ring 30a does not include the node C and E as terminal node, the demands Db02 and Db06 (pointing node C or E) are not accommodated to the ring 30a. If there exists a demand pointing a pair of terminal nodes each selected from the terminal node A, B, and D, the demand may be accommodated to the ring 30a.

As described above, for example, a demand chain can be generated by a procedure from (1) to (4) described below.

(1) Selecting, from among terminal nodes pointed by traffic demands, a start node for generating a series of demands.

(2) Repeating the following demand group selection procedure until a demand group can not be selected any more, where the start node is provided as a given node at the first repeating time.

Here, the demand group selection procedure comprises:

1) Selecting, for a given node, a demand group consisting of traffic demands each of which points the given node as one of the pair of terminal nodes pointed thereby and has not been processed yet by the demand group selection procedure; and 2) Setting the other one of the pair of terminal nodes pointed by each traffic demand of the demand group as a searched node to be processed next as a given node.

(3) Appending, when there exists a traffic demand pointing both the start node and the searched node obtained at the last repeating time, the traffic demand to the series of traffic demands by setting the searched node obtained at the last repeating time as the given node thereof, and the start node as the searched node thereof, respectively.

(4) Determining the obtained series of traffic demands as the demand chain, wherein the searched node pointed by the traffic demand arranged at the last position in the demand chain is determined as a reached node.

Figure 12:
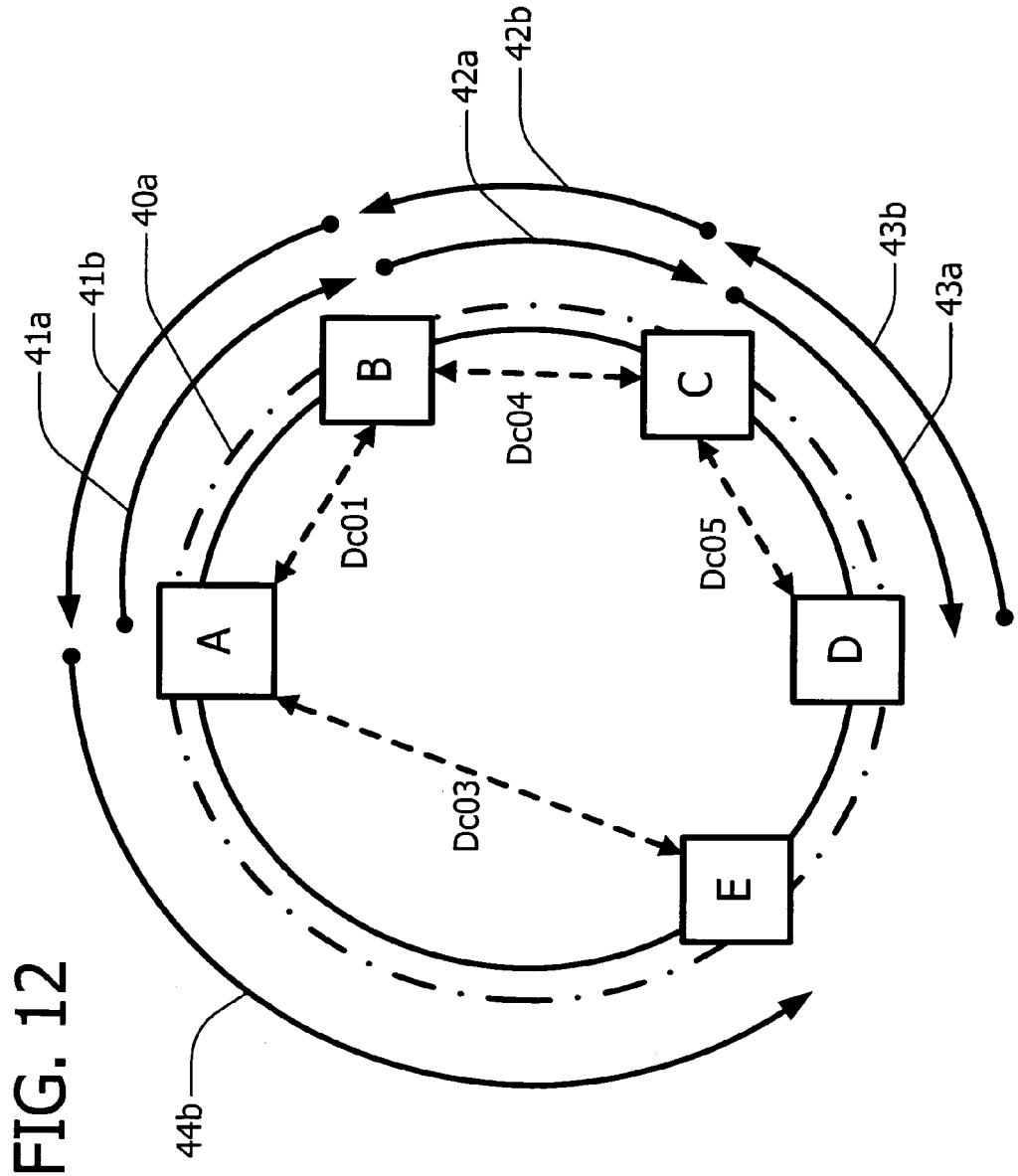
FIG. 12 is a diagram illustrating an example (5) of a procedure for generating a demand chain according to the embodiment.

FIG. 12 is a diagram illustrating an example (5) of a procedure for generating a demand chain according to the embodiment, where the demand chain is generated by searching again the series of demands in the direction opposite to the predetermined node searching direction.

The demand chains obtained by the procedure shown in FIGS. 8 to 10 are closed series of demands. However, a demand chain can become an opened series of demands depending on the situation of given demands. In those cases, as shown in FIG. 12, a procedure for generating a demand chain is retried by setting the final node as a new start node and by searching the nodes in the opposite direction (counterclockwise direction), so as to generate a longer series of demands.

For example, if demands Dc01, Dc02, Dc03, and Dc05 are given as shown in FIG. 12, upon searching nodes pointed by demands in the forward direction (i.e. clockwise direction) from the node A, a series of demands Dc01-Dc04-Dc05 is obtained and a corresponding sequence of demand accommodating routes is determined to be 41a-42a-43a. However, in this case, the obtained series of demands is opened, that is, there exist no demands pointing the pair of the node D and the start node A. Therefore, by searching for nodes pointed by demands in the opposite direction (counterclockwise direction) starting from the node D, a series of demands Dc05-Dc04-Dc01-Dc03 is obtained, and the sequence of demand accommodating routes corresponding thereto becomes 43b-42b-41b-44b. That is, a series of demands longer than the series of demands obtained by the search in the forward direction is generated by the search in the opposite direction on the ring network. As a result, a larger number of demands can be accommodated to the demand accommodating ring 40a including the generated sequence of demand accommodating routes 43b-42b-41b-44b (or 44b-41b-42b-43b). In the case, the series of demands and the sequence of demand accommodating routes obtained by searching in the opposite direction are determined as the demand chain and the demand accommodating route chain, respectively. And the ring 40a including the demand accommodating route chain is determined as the demand accommodating ring.

Here, if the series of demands obtained by the way shown in FIGS. 8 to 10 is closed, the result of searching the series of demands in the opposite direction becomes the same as that in the forward direction. Therefore, the retry of searching nodes in the opposite direction is not needed.

Figure 13:
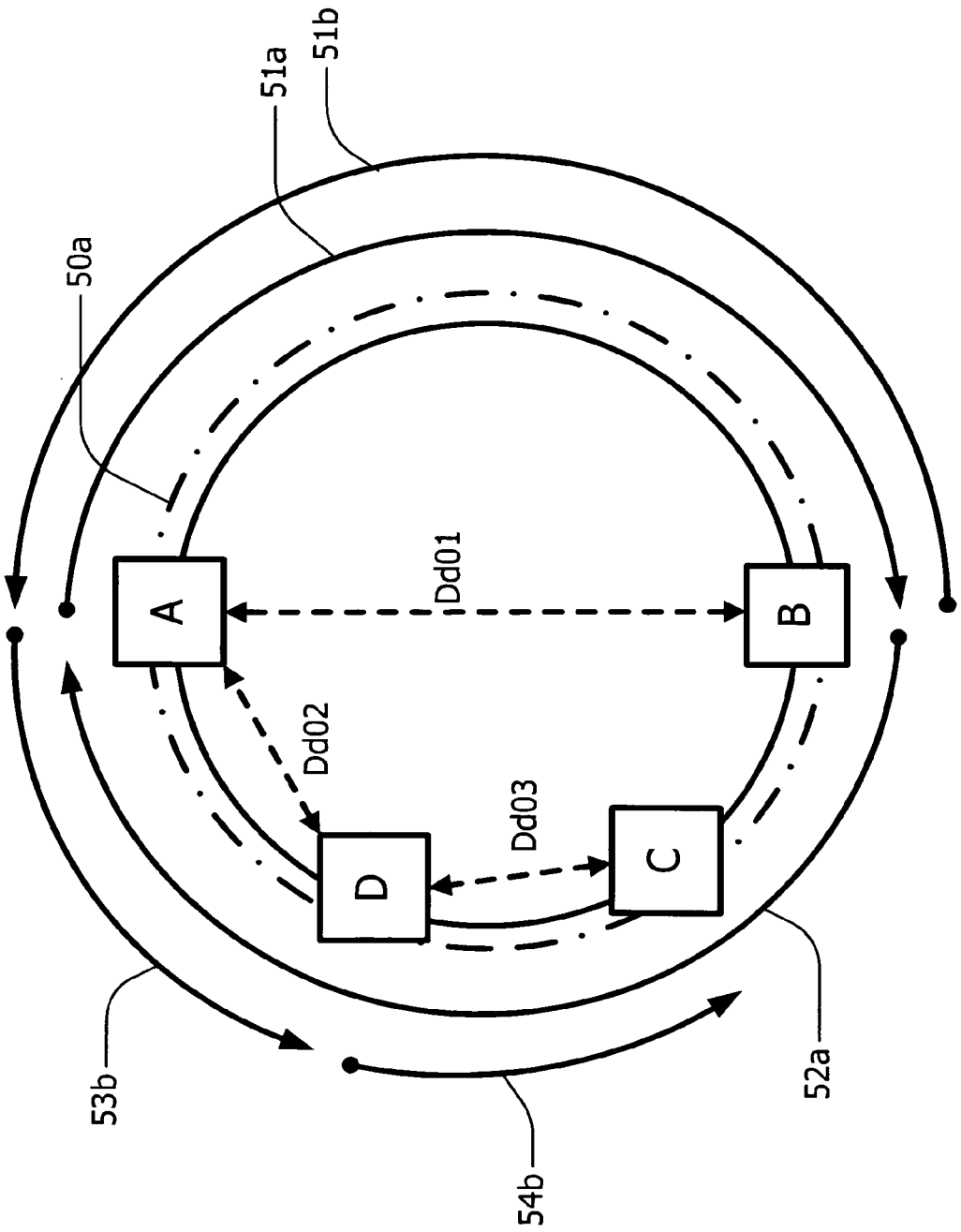
FIG. 13 is a diagram illustrating an example (6) of a procedure for generating a demand chain according to the embodiment.

FIG. 13 is a diagram illustrating an example (6) of a procedure for generating a demand chain according to the embodiment, where the demand chain generated by searching nodes in the clockwise direction consisting of demands pointing only two demand terminal nodes.

As shown in FIG. 13, if the number of demands provided is three (Dd01, Dd02, Dd03) and the series of demands is generated by searching for nodes in the forward direction (clockwise direction) from the start node A, the series of one demand Dd01 and closed sequences of the demand accommodating routes 51a-52a corresponding thereto will be obtained, and the final node is determined as the node B. In the case, if nodes are searched for in the opposite direction (the counterclockwise direction) starting from the final node B, a series of demands Db01-Db02-Db03 and a sequence of demand accommodating routes 51b-53b-54b corresponding thereto are obtained. As a result, a larger number of demands can be accommodated to a ring 50a. In this case, the series of demands obtained by searching for nodes in the opposite direction (for example, Db01-Db02-Db0) is determined as the demand chain, and the sequence of demand accommodating routes corresponding thereto is determined as the demand accommodating route chain (for example, 51b-53b-54b). As a result, the ring 50a including the demand accommodating route chain obtained is determined as the demand accommodating ring.

Figure 14:
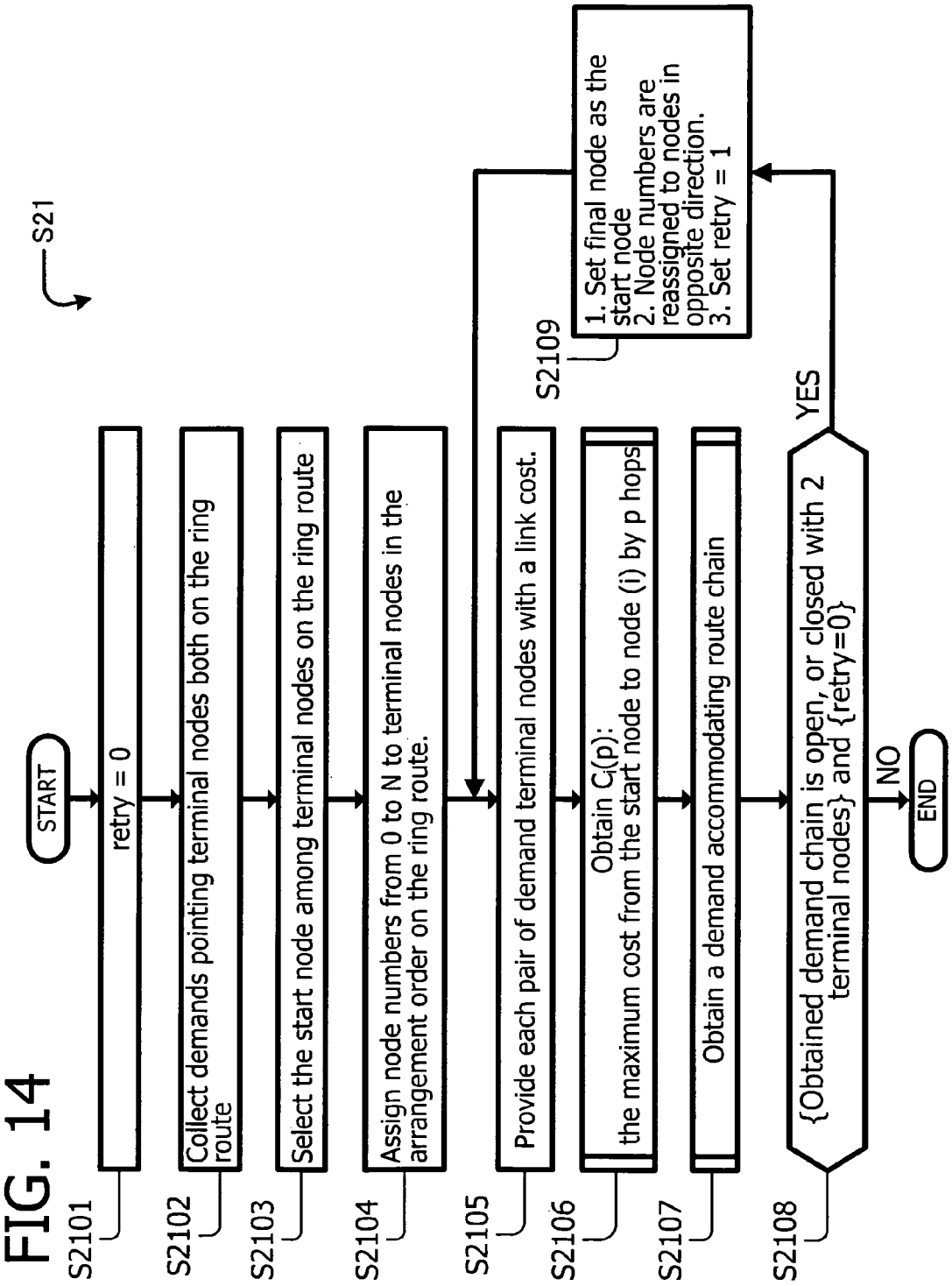
FIG. 14 is an example (1)of an operation flow for determining a demand chain according to the embodiment.

FIG. 14 is an example (1) of an operation flow for determining a demand chain according to the embodiment, showing the details of step S21 in the operation flow shown in FIG. 5.

In step S2101, "0" is set to the retry counter "retry".

In step S2102, demands each pointing a pair of terminal nodes both included in the ring route to be designed are collected.

In step S2103, for all the terminal nodes on the ting route, the following conditions are checked in the order of (Condition 1) to (Condition 4) so as to determine the start node.

(Condition 1) The number of different pairs of demand terminal nodes including the terminal node to be processed as one node thereof is greater.

(Condition 2) The total bandwidth required by demands each pointing the terminal node to be processed as one of the pair of demand terminal nodes pointed thereby is greater.

(Condition 3) The total number of demands each pointing the terminal node to be processed as one of the pair of demand terminal nodes pointed thereby is greater.

(Condition 4) The total number of ports required by demands each pointing the terminal node to be processed as one of the pair of demand terminal nodes pointed thereby is greater.

Herein, it is possible to change the priority order of (Condition 2), (Condition 3), and (Condition 4).

In the example shown in FIG. 7, since different pairs of demand terminal nodes each including the node A as one end are (A, B), (A, C), and (A, D), the number of the different pair is three. Similarly, the number of different pairs of demand terminal nodes regarding the node B is two ((A, B) and (B, D)). The number of different pairs of demand terminal nodes regarding the node C is two ((A, C) and (C, E)). The number of different pairs of demand terminal nodes regarding the node D is two ((A, D) and (B, D)). As a result, the node A becomes the start node under (Condition 1).

In step S2104, let N be the number of demand terminal nodes on the ring route, and the demand terminal nodes on the ring route are numbered from "0" to "N" in the arrangement order on the ring route. In this case, the start node is numbered to "0" and numbers obtained by sequentially adding "1" are assigned to terminal nodes on the ring route in a predetermined rotation direction, respectively. In the case, for a convenience of the explanation, the predetermined rotation direction is set as a clockwise direction on the ring route. Hereinafter, a number assigned to a node is expressed as "a node number" and a node having the node number "i" is expressed as a "node i" or a "node (i)". Further, a node "N" is treated as a node "0", that is, as the start node.

In step S2105, in accordance with information indicated by demands to be accommodated between the pair of terminal nodes i and j, a link cost (i, j) between the terminal nodes i and j is given beforehand. Herein, although the link cost (i, j) is considered as the total bandwidth required for demands pointing the terminal nodes i and j, a link cost (i, j) can be set as the number of demands between the terminal nodes i and j or the number of ports required for demands between the terminal nodes i and j. Hereinafter, "a link cost (i, j)" can be abbreviated as "cost (i, j)".

In step S2106, the maximum total link cost $C_i(p)$ (i=1, 2, 3, ..., N, p=1, 2, ..., min[16, N]), which is a accumulated link cost when the search reaches the node i from the start node by p hops, is obtained. Details of the processing will be described later with reference to FIG. 15.

In step S2107, the demand accommodating route chain is obtained in association with the demand chain. Details of the processing will be described later with reference to FIG. 16.

In step S2108, it is determined whether the demand chain is open or closed sequence having two terminal nodes, and further a retry counter "retry" is "0".

If the demand chain is open or closed sequence having two nodes and further a retry counter "retry" is "0" (YES in step S2108), the processing shifts to step S2109, and otherwise (NO in step S2108), the processing ends. Therefore, when the processing of step S2109 has been already performed, the retry counter "retry" becomes "1" and the processing ends.

In step S2109, the process for generating a demand chain is retried in the opposite direction as shown in FIG. 12. That is, the final node is set as the start node, node numbers are assigned to nodes on the ring in the opposite direction, and the processing returns to step S2105. At the time, "1" is set to the retry counter "retry", the demand chain obtained up to this time is canceled, and the result obtained at the time of the next retry processing is determined as the final result.

Figure 15:
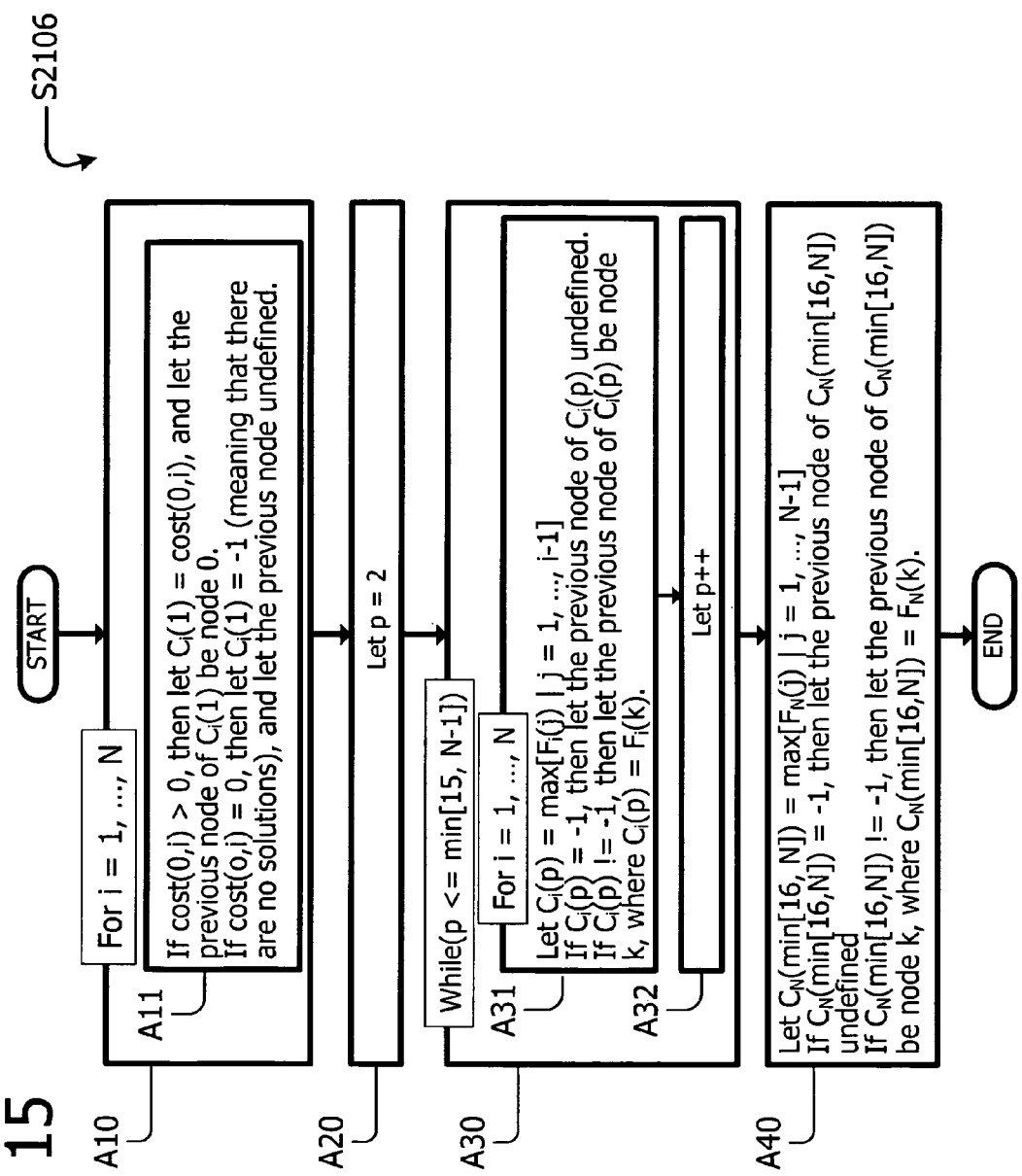
FIG. 15 is an example (2) of an operation flow for determining a demand chain according to the embodiment.

FIG. 15 is an example (2) of an operation flow for determining a demand chain according to the embodiment, showing the details of step S2106 of FIG. 14. Herein, the maximum total link cost for reaching the given node by the given number of pops is obtained. That is, the maximum total link cost $C_i(p)$ (where i=1, 2, ..., N, p=1, 2, ..., min[16, N]) in the case of reaching the node i by p hops is obtained. Hereinafter, "the maximum total link cost $C_i(p)$" is abbreviated as "the maximum cost $C_i(p)$", and a node reached by (p-1) hops of search is expressed as "a previous node of maximum cost $C_i(p)$".

In step A10, the maximum cost $C_i(1)$ is first calculated. $C_i(1)$ denotes the maximum link cost when reaching the node i by one hop from the start node 0. Therefore, in step A11, if there is a demand between the nodes 0 and i, the link cost between the nodes 0 and i is given and a previous node of the maximum cost $C_i(1)$ is set as the node 0. On the other hand, when there is no demands between the nodes 0 and i, "-1" is given to $C_i(1)$, indicating that there exist no demands between the nodes 0 and i. In this case, the previous node is not given since the maximum cost $C_i(1)$ cannot be defined.

In step A20, an initial value "2" is set to a variable p.

In step A30, for p (p<=min[15, N-1], that is, p=2, ..., min[15, N-1]), processing of the following steps A31 and A32 is repeated. Therefore, in the case of N=2, processing in step A30 is skipped since p becomes "1" which is not the case. In the case of N≧3, processing of the following steps A31 and A32 is executed.

In step A31, for i=1, ..., N, the maximum cost $C_i(P)$ is sequentially calculated.

Herein, we define function $F_i(j)$ (j=1, ..., i-1) as cost(j, i)+$C_j(p-1)$ (an accumulated value of the maximum costs) when $C_j(p-1)$ has a valid value and at least one demand exists between the nodes i and j, in other words, when $C_j(p-1)$!=-1 and cost(j, i)!=0, where "!=" means "not equal to".

On the other hand, when $C_j(p-1)$ does not have a valid value or demands do not exist between the nodes i and j, in other words, when $C_j(p-1)$=-1 or cost(j, i)=0, we define $F_i(j)$=-1.

Then, the maximum cost $C_i(p)$ is obtained as the maximum value of $F_i(j)$ (j=1, ..., i-1) where the previous node of $C_i(p)$ is set as node k where k maximizes $F_i(k)$ (k=1, ..., i-1), that is, $C_i(p)$=$F_i(k)$.

According to the above definition, when $C_j(p)$ (j=1, ..., i-1) do not have valid values, $F_i(j)$=-1 (j=1, ..., i-1) is obtained. Therefore, $C_i(p)$=-1 is obtained.

In step A32, the variable p is counted up by 1 (+1).

In step A40, $C_N$(min[16, N]) is calculated.

$C_N$(min[16, N]) is obtained as the maximum value of $F_N(j)$ (j=1, ..., N-1). The previous node of $C_N$(min[16, N]) is set as node k where k maximizes $F_N(k)$, that is, $C_N$(min[16, N]) $F_N(k)$ in the case of $C_N$(min[16, N])!=-1, whereas the previous node is not given in the case of $C_N$(min[16, N])=-1, and then the processing ends.

Figure 16:
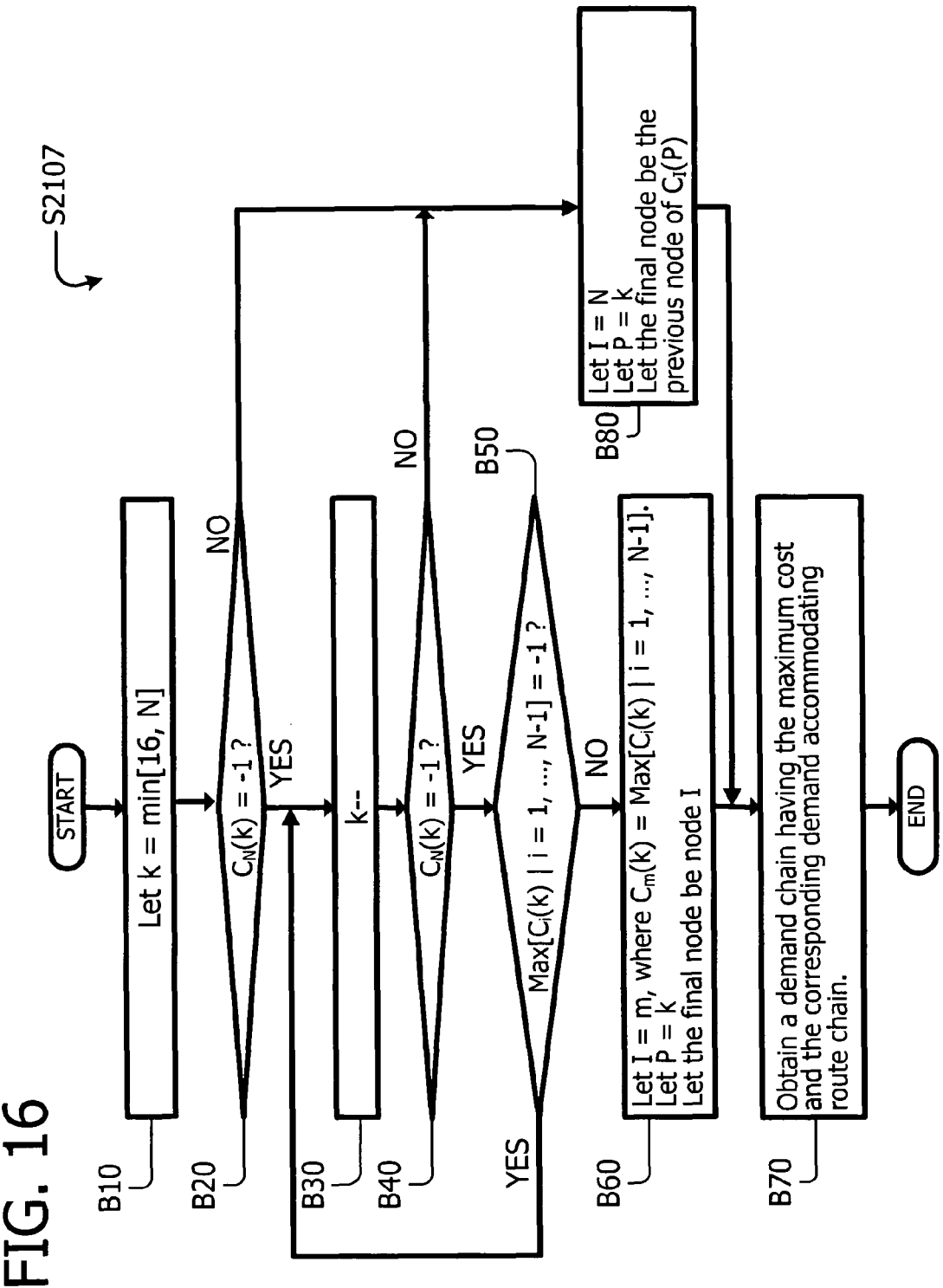
FIG. 16 is an example (3) of an operation flow for determining a demand chain according to the embodiment.

FIG. 16 is an example (3) of an operation flow for determining a demand chain according to the embodiment, showing the details of processing for obtaining the demand accommodating route chain in step S2107 of FIG. 14.

Here, from among the set of maximum cost $C_i(p)$ (i=1, ..., N, p=1, ..., min[16, N]) that are obtained in step S2106 of FIG. 14, the one not equal to "-1" and corresponding to a series of demands having the highest priority described in FIG. 6 is extracted. That is, by setting k=min[16, N], the maximum cost $C_i(p)$ not equal to "-1" is searched for among the set of maximum cost values $C_i(p)$ (i=1, ..., N, p=1, ..., k) in the priority order of $C_N(k)$, $C_N(k-1)$, max[$C_i(k-1)$|i=1, ..., N-1], $C_N(k-2)$, max[$C_i(k-2)$|i=1, ..., N-1], ..., $C_N(2)$, and max[$C_i(2)$|i=1, ..., N-1].

And the maximum cost value $C_i(p)$ first found is used to determine the corresponding demand chain and the corresponding demand accommodating route chain.

In the above set of maximum cost values $C_i(p)$ (i=1, ..., N, p=1, ..., min[16, N]), $C_N(2)$ becomes the possible maximum cost value of the lowest priority since $C_N(2)$ has a valid value other than "-1" in any case.

The above procedure can be performed, for example, as follows.

In step B10, the value min[16, N] is set at a variable k.

In step B20, it is determined whether $C_N(k)$=-1 or not. If $C_N(k)$=-1 (YES in step B20), the processing shifts to step B30. If $C_N(k)$=-1 is not established (NO in step B20), the processing shifts to step B80.

In step B30, the variable k is counted down by 1 (-1).

In step B40, it is determined whether $C_N(k)$=-1 or not. If $C_N(k)$=-1 (YES in step B40), the processing shifts to step B50. If $C_N(k)$=-1 is not established (NO in step B40), the processing shifts to step B80.

In step B50, it is determined whether Max[$C_i(k)$|i=1, ..., N-1]=-1 or not. If Max[$C_i(k)$|i=1, ..., N-1]=-1 (YES in step B50), the processing returns to step B30. If Max[$C_i(k)$|i=1, ..., N-1]=-1 is not established (NO in step B50), the processing shifts to step B60. In step B60, the value m maximizing $C_m(k)$, that is, such a value m that $C_m(k)$=Max[$C_i(k)$|i=1, ..., N-1] is set to a variable I, and k is set to variable P. The node designated by I is set as the final node.

In step B70, the series of demands determined by $C_f(P)$ obtained in step B60 is traced back from the final node (I) to the node (0) in counter-clockwise direction, thereby generating a demand chain having the maximum cost. Then, a sequence of demand accommodating routes corresponding to the generated demand chain is determined as the demand accommodating route chain, and the processing ends.

Herein, if I=N, the obtained demand accommodating route chain is a closed chain, and the number of terminal nodes on the demand accommodating route chain becomes "P". Whereas, if I<N, the obtained demand accommodating route chain is a open chain, and the number of terminal nodes on the demand accommodating route chain becomes P+1.

In step B80, the value N is set to I and the value k is set to P. The node which is reached at one hop before the node I corresponding to the maximum cost $C_f(P)$, that is, the previous node of $C_f(P)$ is set as the final node, and the processing shifts to step B70.

Figure 17A:
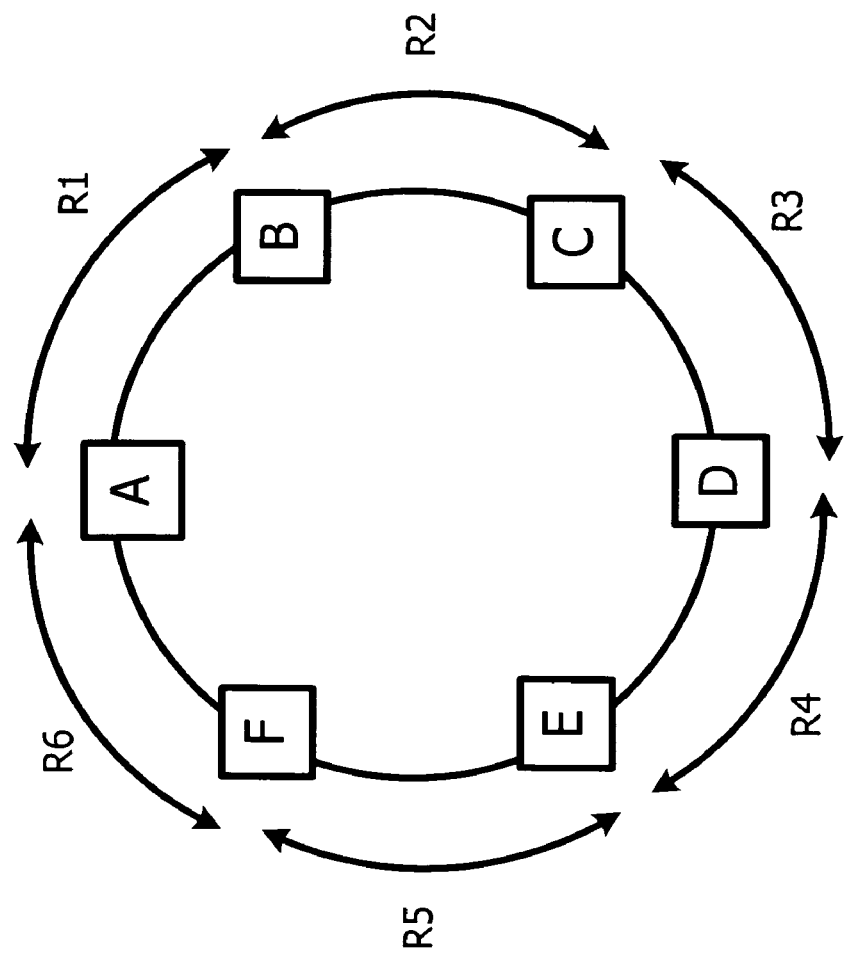
FIGS. 17A and 17B are diagrams illustrating the outline of a method for accommodating traffic demands to a demand accommodating ring according to the embodiment.
Figure 17B:
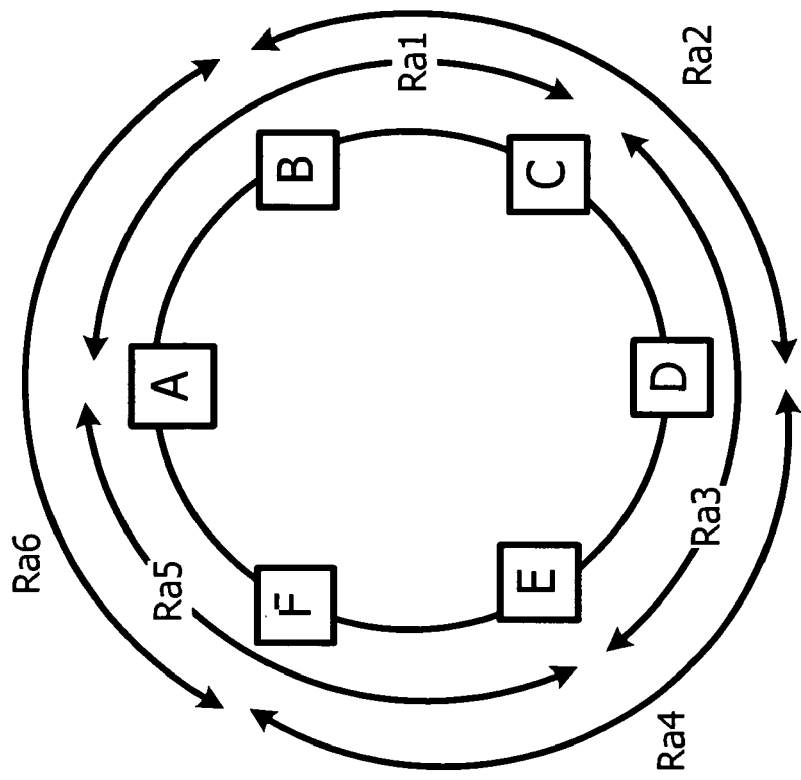

FIGS. 17A and 17B are diagrams illustrating the outline of a method for accommodating traffic demands to a demand accommodating ring according to the embodiment.

In the following, a demand pointing a pair of terminal nodes adjacent on the demand accommodating ring, that is, a demand pointing a pair of terminal nodes connected via single link on the demand accommodating ring is expressed as a single-link demand. Further, a demand pointing a pair of terminal nodes nonadjacent on the demand accommodating ring, that is, a demand pointing a pair of terminal nodes connected via a plurality of links on the demand accommodating ring, is expressed as a plural-link demand.

FIG. 17A depicts an example of accommodating single-link demands to the demand accommodating ring having six terminal nodes. Hereafter, a demand between the nodes A and B is expressed as "demand (A, B)". Then, demand (A, B), demand (C, D), demand (D, E), demand (E, F), and demand (F, A) are single-link demands, and accommodated in routes R1, R2, R3, R4, R5, and R6 on the demand accommodating ring, respectively.

On the other hand, a plural-link demand is a demand pointing a pair of terminal nodes connected via a plurality of links on the demand accommodating ring.

Therefore, in the case of accommodating a plural-link demand, client signal paths required by a plurality of different demands can be accommodated using the same link between the two terminal nodes on the demand accommodating ring.

FIG. 17B depicts an example of accommodating plural-link demands to the demand accommodating ring having six terminal nodes. Herein, the demand (A, C), demand (B, D), demand (C, E), demand (D, F), demand (E, A), and demand (F, B) are plural-link demands of two links and accommodated to routes Ra1, Ra2, Ra3, Ra4, Ra5, and Ra6 on the demand accommodating ring, respectively. In this case, the routes Ra1 and Ra2 for accommodating the plural-link demand (A, C) and the plural-link demand (B, D) are sharing the link between the terminal nodes B and C.

Although FIG. 17B depicts an example of plural-link demands having two links, the same may be said of plural-link demands having three or more links. Here, it should be noted that signal paths required by a demand can be accommodated in two rotation directions on the demand accommodating ring. For example, signal paths required by a demand pointing the pair of terminal nodes A and F of FIG. 17B can be accommodated to the route of clockwise direction having 5 links (A→B→C→D→E→F) or to the route of counter-clockwise direction having 1 link (A→F).

In order to accommodate demands efficiently, it is preferable to firstly accommodate as many single-link demands as possible to the demand accommodating ring, and to secondly accommodate plural-link demands to the idle bandwidth of the demand accommodating ring to which the single-link demands have been already accommodated.

FIG. 18 is a diagram illustrating the outline of an operation flow for accommodating traffic demands to a demand accommodating ring according to the embodiment, showing the details of the processing in step S22 of FIG. 5. In the case, demands each pointing a pair of terminal nodes both included in the accommodating ring are accommodated to the demand accommodating ring which includes the demand accommodating route chain generated in step S21 in FIG. 5. Here, for example, the number of communication ports for client signals and a signal bandwidth of an optical transmitting and receiving apparatus arranged in the node are taken into consideration.

In step S2201, single-link demands each pointing a pair of terminal nodes both included in the demand accommodating ring are accommodated to the demand accommodating ring. The details of step S2201 will be described later with reference to FIGS. 19 and 20.

In step S2202, it is determined whether the number of terminal nodes pointed by demands in the demand chain, that is, n is larger than two or not. If "n>2" (YES in step S2202), the processing advances to step S2203. If n is not larger than 2, that is, n is 2 or less than 2 (NO in step S2202), the processing ends.

In step S2203, plural-link demands each pointing a pair of terminal nodes both included in the demand accommodating ring are accommodated to the portion having idle bandwidths and idle communication ports on the demand accommodating ring to which the single-link demands already have been accommodated in step S2201. The details of step S2203 will be described later with reference to FIGS. 22, 23, and 24.

Accommodating demands to the demand accommodating ring in steps S2201 and S2203 can be performed, for example, by using a method described in Japanese Patent Application No. 2006-26931, where, for the given number of client ports P and an given optical signal bandwidth BW, the combination of demands for maximally using the client port and an optical signal bandwidth is generated and is accommodated.

Figure 19:
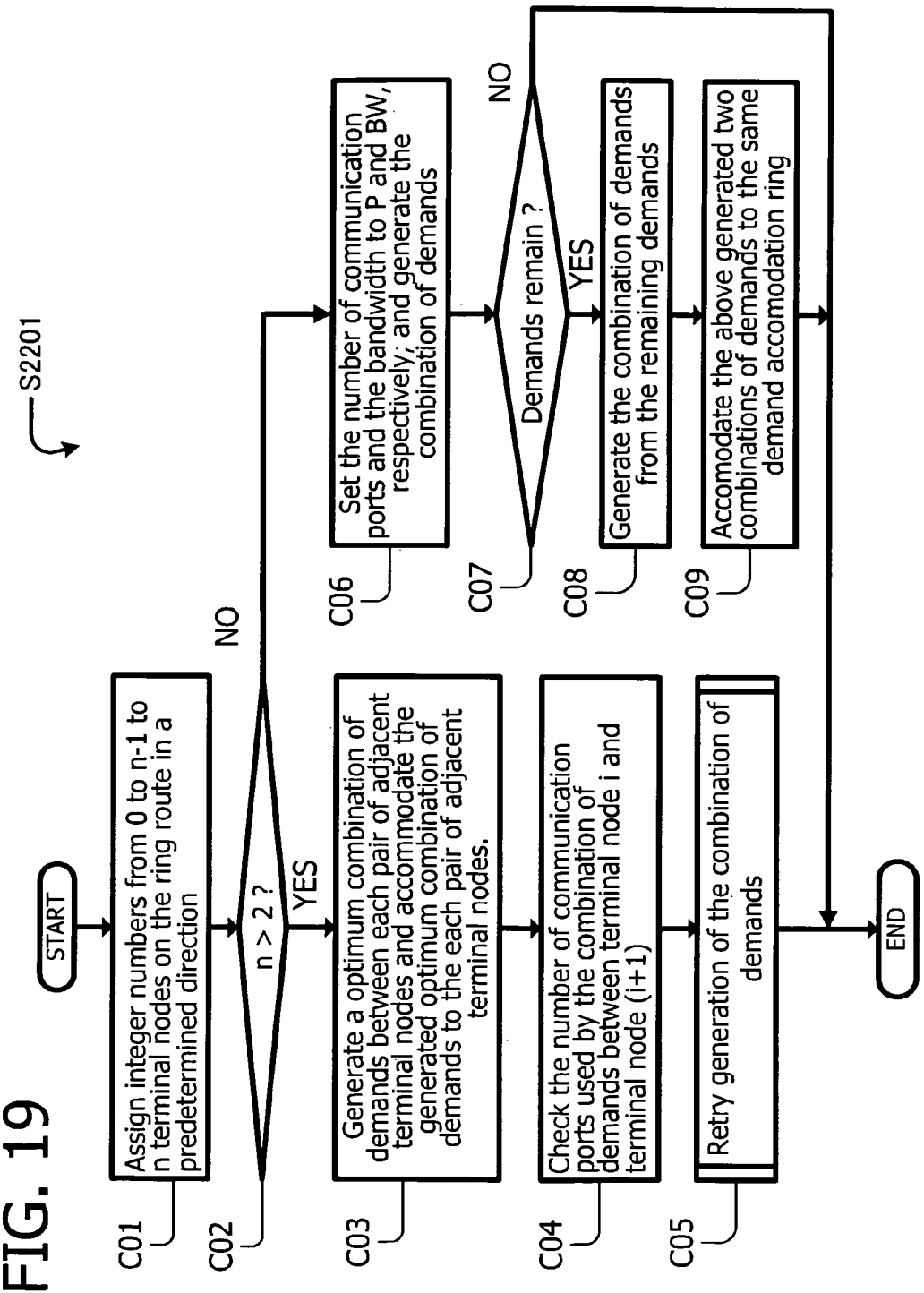
FIG. 19 is a diagram illustrating an example (1) of an operation flow for accommodating single-link demands according to the embodiment.

FIG. 19 is a diagram illustrating an example (1) of an operation flow for accommodating single-link demands according to the embodiment, showing the details of step S2201 in FIG. 18.

Herein, it is assumed that the client ports of two transmitting and receiving apparatuses arranged in the terminal node are assigned to both two sides of the terminal node (to one side for the clockwise direction and the other side for counterclockwise direction), respectively.

In step C01, one terminal node on the demand accommodating ring is first selected, and the node number of the selected node is set to "0". Then, in a predetermined rotation direction (e.g., clockwise direction) on the ring route, node numbers from "0" to "n−1" are sequentially assigned to n terminal nodes on the ring. However, in the case of the demand accommodating ring generated based on an open demand chain, one of the terminal nodes at the end of the demand accommodating route chain corresponding to the open demand chain is set as a node having the node number "0", and, the node numbers from "0" to "n−1" are assigned to n terminal nodes in the order of a predetermined direction on the demand accommodating ring.

In step C02, it is determined whether n>2 or not. If n>2 (YES in step C02), the processing shifts to step C03. If n≦2, that is, n=2 (because n=1 is impossible) (NO in step C02), the processing shifts to step C06.

In step C03, the number of client ports that can be accommodated to one transmitting and receiving apparatus is set to a variable "P", and a available signal bandwidth of the demand accommodating ring is set to a variable "BW". Optimum combination of demands is generated and client signal paths required by the combination of demands are accommodated between two adjacent terminal nodes on the demand accommodating ring. Herein, on the SONET BLSR ring, the signal bandwidth BW is half the network bandwidth of the demand accommodating ring since the half of the optical signal bandwidth is used by a main signal (that is, working client signals) on the SONET BLSR ring.

Here, the generation of the combination of demands mentioned above can be performed, for example, by using a method described in Japanese Patent Application No. 2006-269361.

In step C04, if n>2, the number of communication ports used by the combination of demands is checked. Let Port(i) be the number of communication ports used by the combination of demands between the nodes (i) and (i+1), where (i+1) is set at "0" if (i+1) becomes n. Here, the number of ports connected with an idle span in the opened demand chain, that is, Port(n−1) is set at "0".

Next, the route between adjacent terminal nodes having an idle port is searched for on the demand accommodating ring. Here, such a node (i) is searched that both Port(i−1) and Port(i+1) are smaller than P and Port(i) is equal to P. If such a node (i) exists, it is possible that client signal paths requested by demands are additionally accommodated between the node (i) and (i+1).

Here, as will be described later with reference to FIG. 21, the case where P=8 and each node has 16 communication ports is checked as a typical example. When Port(0)=7, Port(1)=8, and Port(2)=6, the total numbers of used ports of nodes (1) and (2) is 7+8=15 and 8+6=14, respectively. Therefore, one more port can be used for demands between the nodes (1) and (2).

In step C05, if it is determined that the demand can be additionally accommodated between the node (i) and (i+1), on the basis of the check result in step C04, the generation of combination of demands between the node (i) and (i+1) is retried by setting the number of communication ports at "2P−max[Port(i−1), Port(i+1)]" and the bandwidth at "BW", and then the processing ends. For example, in an example shown in FIG. 21 which will be described later, the generation of the combination of demands is retried by setting the number of communication ports at 16−7=9. The details of the processing will be described later with reference to FIGS. 20 and 21.

The generation of the combination of demands mentioned above can be performed, for example, by using a method described in Japanese Patent Application No. 2006-269361.

In step C06, the combination of demands is generated by setting the number of communication ports to P and the bandwidth to BW.

The generation of the combination of demands mentioned above can be performed, for example, by using a method described in Japanese Patent Application No. 2006-269361.

In step C07, since n≦2, n becomes 2 (because n=1 is impossible). Here, it is determined whether or not there remain unprocessed demands pointing pairs of the two terminal nodes on the demand accommodating ring. If there remains unprocessed demands (YES in step C07), the processing advances to step C08. If there remain no unprocessed demands (NO in step C07), the processing ends.

In step C08, for the remaining unprocessed demands pointing pairs of the two terminal nodes, the combination of demands is generated, by setting the number of communication ports at "2P−(the number of used communication ports as the result of combination generated previously)", the bandwidth at "BW", and the limitation on the number of all signals at "0 or more". In the previous application (Japanese Patent Application No. 2006-269361), such a condition is set that the demands includes at least one signal having the maximum bandwidth. However, since the combination of demands generated previously takes the above condition into consideration, the limitation on the number of all signals is removed here.

The generation of the combination of demands described above can be performed, for example, by using a method described in Japanese Patent Application No. 2006-269361.

In step C09, two combinations of demands generated in steps C06 and C08 is accommodated to two routes on the same demand accommodating ring in association with the clockwise and counterclockwise directions between two terminal nodes, respectively. Then, the processing ends.

In this case (n=2), when performing the integration processing on demand accommodating rings in step S30 in FIG. 5, the accommodation needs to be performed in consideration of the situation that each of the combinations of demands can be assigned to any one of the two routes having different rotation directions on the demand accommodating ring.

Figure 20:
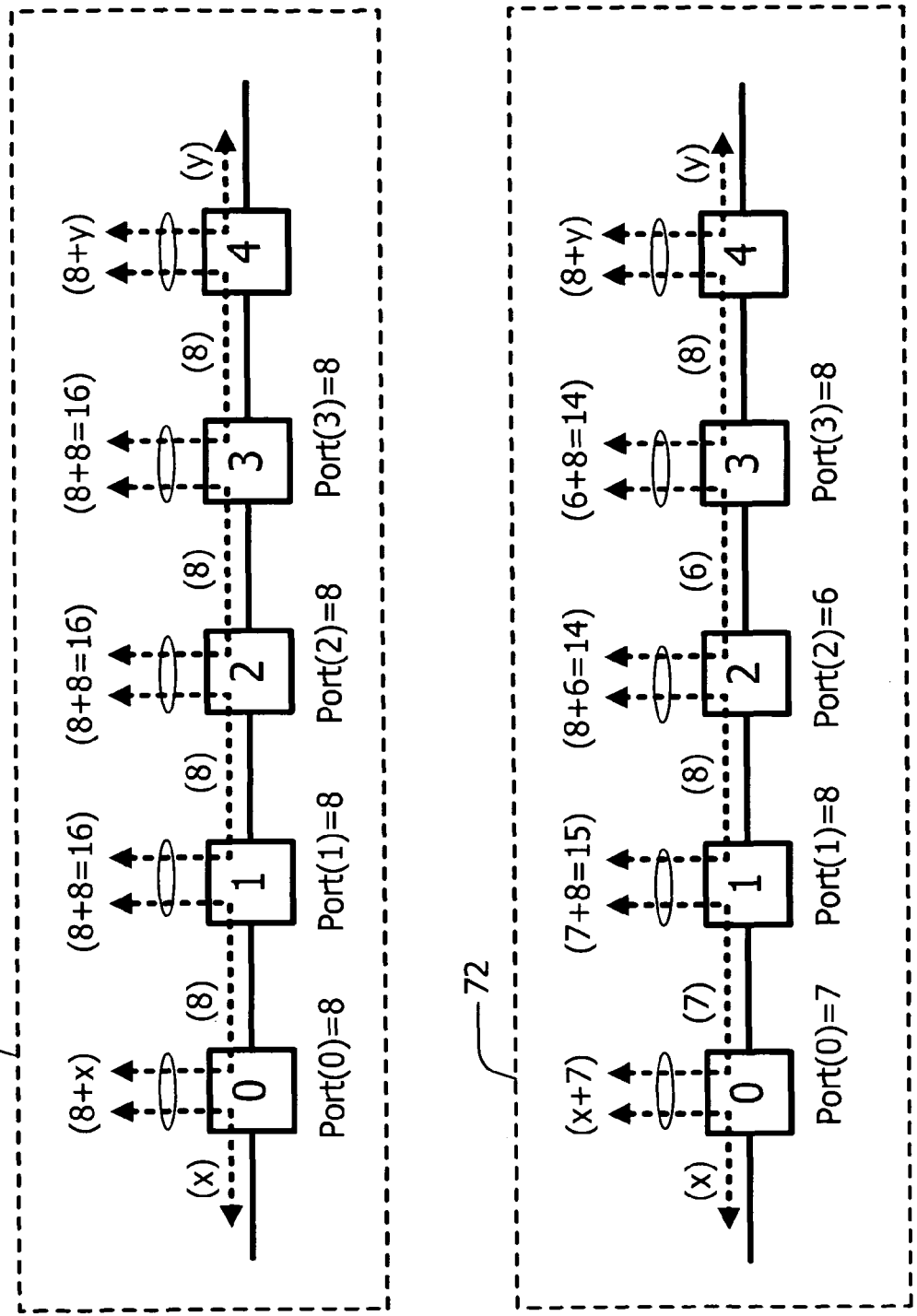
FIG. 20 is a diagram illustrating the outline of a method for assigning communication ports according to the embodiment.

FIG. 20 is a diagram illustrating the outline of a method for assigning communication ports according to the embodiment, showing one example of the processing in steps C04 and C05 of FIG. 19.

Herein, transmitting and receiving apparatuses for traffic of clockwise and counterclockwise directions are provided for each node. The maximum of eight communication ports can be accommodated to each transmitting and receiving apparatus. Further, the number of used communication ports as the result of the combination of demands between the nodes (i) and (i+1) is denoted by Port(i), where (i+1) is set at "0" when (i+1) becomes n. Each transmitting and receiving apparatus can accommodate eight communication ports. Here, within one node, data can be transferred between the two transmitting and receiving apparatuses: one for the clockwise direction and the other one for counterclockwise direction.

Reference numeral 71 denotes a state in which there are no idle communication ports in the terminal node. In the case, eight communication ports are assigned to one transmitting and receiving apparatus, and the following relation is obtained.

Port(0)=Port(2)=Port(3)=8

Reference numeral 72 denotes an example of changing the port assignment when there are idle communication ports.

First, an idle communication port is specified by searching such a node (i) that both the Port(i−1) and Port(i+1) are smaller than P (=8) and that Port(i) is equal to P. In this example, node (1) is found to be the case since Port(0)=7, Port(1)=8, Port(2)=6. Therefore the total number of used ports of the nodes (1) and (2) become 15 (=7+8) and 14 (=8+6), respectively. This means that one more port is available for demands between the nodes (1) and (2).

In the case, as shown in step C05 of FIG. 19, the generation of the combination of demands is retried by setting the number of communication ports between the nodes (1) and (2) at "2P−max[Port(i−1), Port(i+1)]=2×8−7=9" and the bandwidth at "BW", respectively, thereby efficiently accommodating client signal paths requested by demands to the idle communication port.

Figure 21:
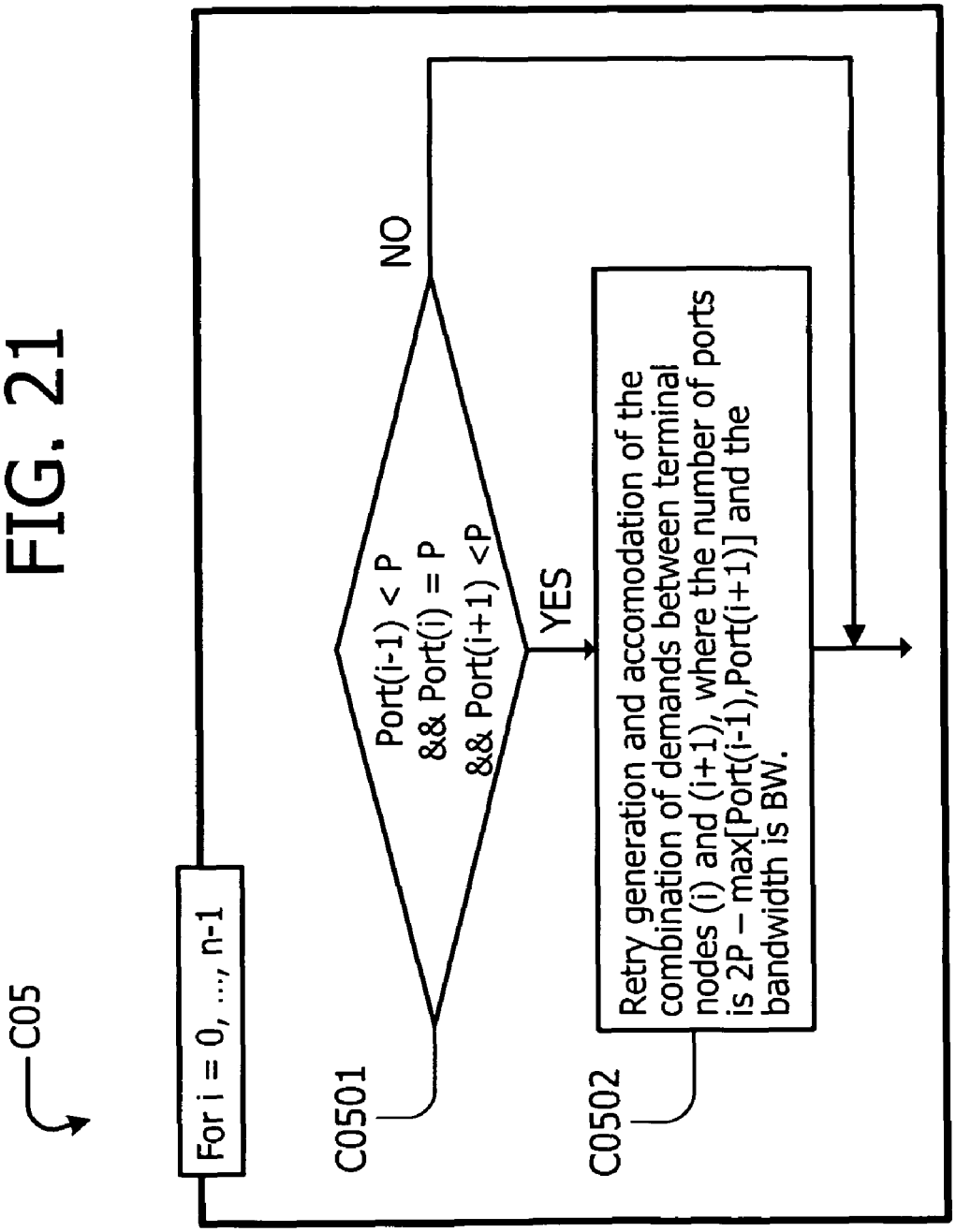
FIG. 21 is a diagram illustrating an example (2) of an operation flow for accommodating single-link demands according to the embodiment.

FIG. 21 is a diagram illustrating an example (2) of an operation flow for accommodating single-link demands according to the embodiment, showing the details of step C05 in FIG. 19.

The processing of steps C0501 and C0502 is performed for i=0, ..., n−1, and then ends. In step C0501, it is determined whether Port(i−1)<P, Port(i)=P, and Port(i+1)<P are simultaneously established or not. If Port(i−1)<P, Port(i)=P, and Port (i+1)<P are simultaneously established (YES in step C0501), the processing shifts to step C0502. If Port(i−1)<P, Port(i)=P, and Port(i+1)<P are not simultaneously established (NO in step C0501), the processing ends.

In step C0502, the generation and accommodation of the combination of demands between nodes (i) and (i+1) are retried, by setting the number of ports at "2P−max[Port(i−1), Port (i+1)]" and the bandwidth at "BW".

Figure 22A:
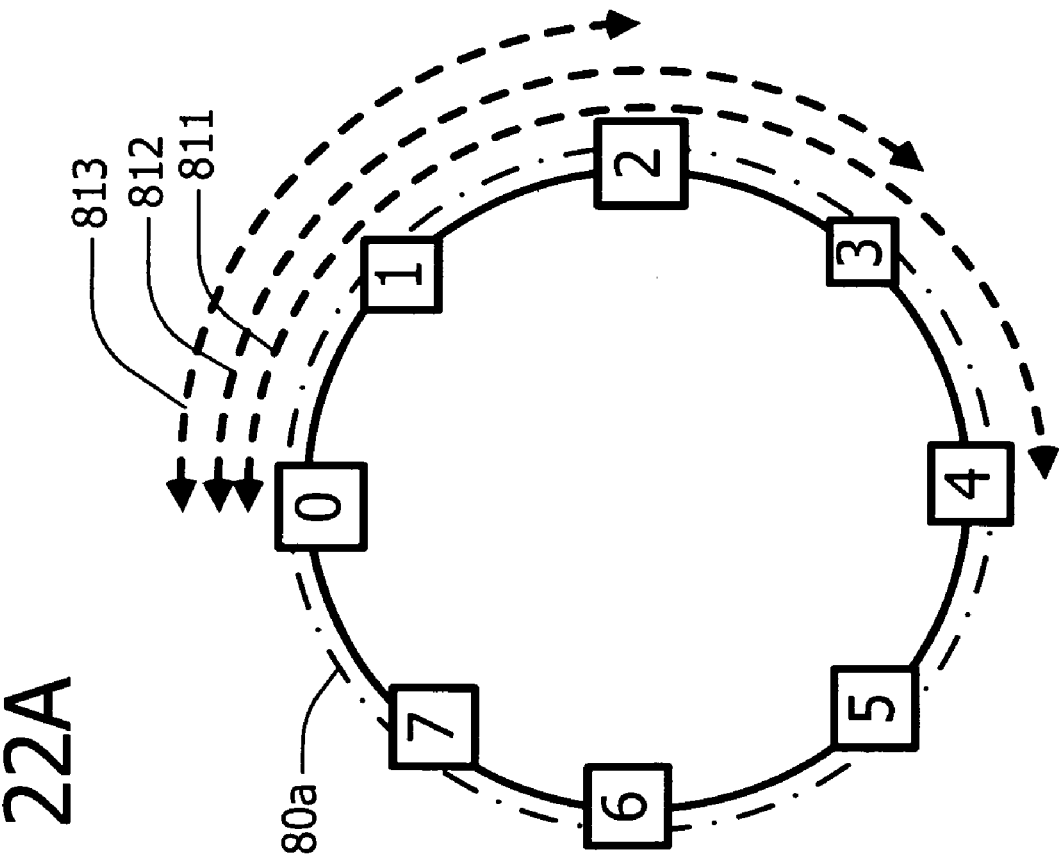
FIGS. 22A and 22B are diagrams illustrating the outline of a method for accommodating plural-link demands according to the embodiment.
Figure 22B:
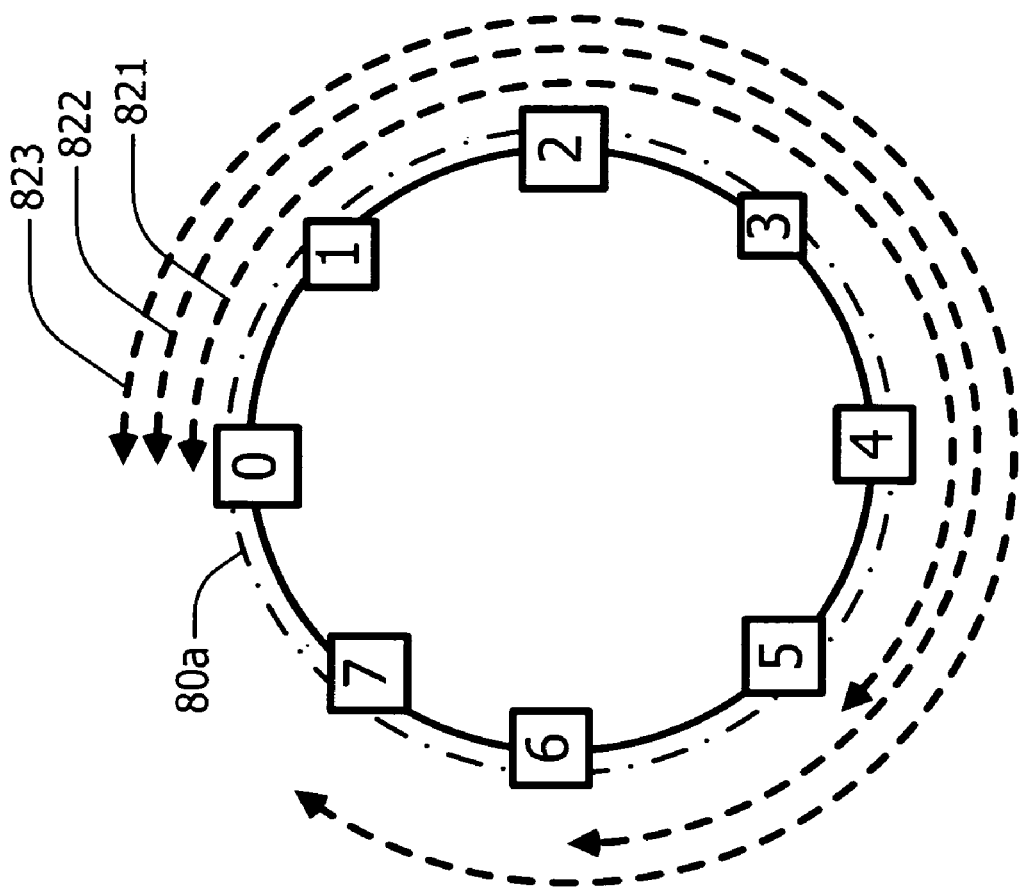

FIGS. 22A and 22B are diagrams illustrating the outline of a method for accommodating plural-link demands according to the embodiment, showing a example for accommodating plural-link demands to the demand accommodating ring having 8 terminal nodes.

When accommodating plural-link demands to a demand accommodating ring 80a, floor (n/2) is first calculated. Herein, floor(x) is a function indicating the greatest integer not greater than x. Therefore, for example, if n=8, floor (n/2) becomes "4".

Next, as the first-half of demand accommodating processing, for each of the number of links of demands to be accommodated, from the initial value of "floor (n/2)" to "2", client signal paths required by the demands are accommodated to the demand accommodating ring in the descending order of the number of links. In the example shown in FIG. 22A, a plural-link demand 811 having four links is first accommodated. Herein, as a representative of demands having four links, only the demand 811 between terminal nodes (0) to (4) is shown. However, all the demands having four links (not shown in FIG. 22A) that can be accommodated to the demand accommodating ring 80a can be accommodated in the same way. Thereafter, the demands having the smaller number of links are sequentially accommodated. That is, a demand (e.g., demand 812) having three links and a demand (e.g., demand 813) having two links are sequentially accommodated.

Next, as the latter-half of the demand accommodation processing, for each of the number of links of demands to be accommodated, from the initial value of "floor (n/2)" to "n−1", the demands are accommodated to the demand accommodating ring in the ascending order of the number of links. In an example shown in FIG. 22B, the demand (e.g., demand 821) having five links, the demand (e.g., demand 822) having six links, and the demand (e.g., demand 823) having seven links are sequentially accommodated.

By the method described above, the plural-link demands can be accommodated efficiently to the demand accommodating ring.

Figure 23:
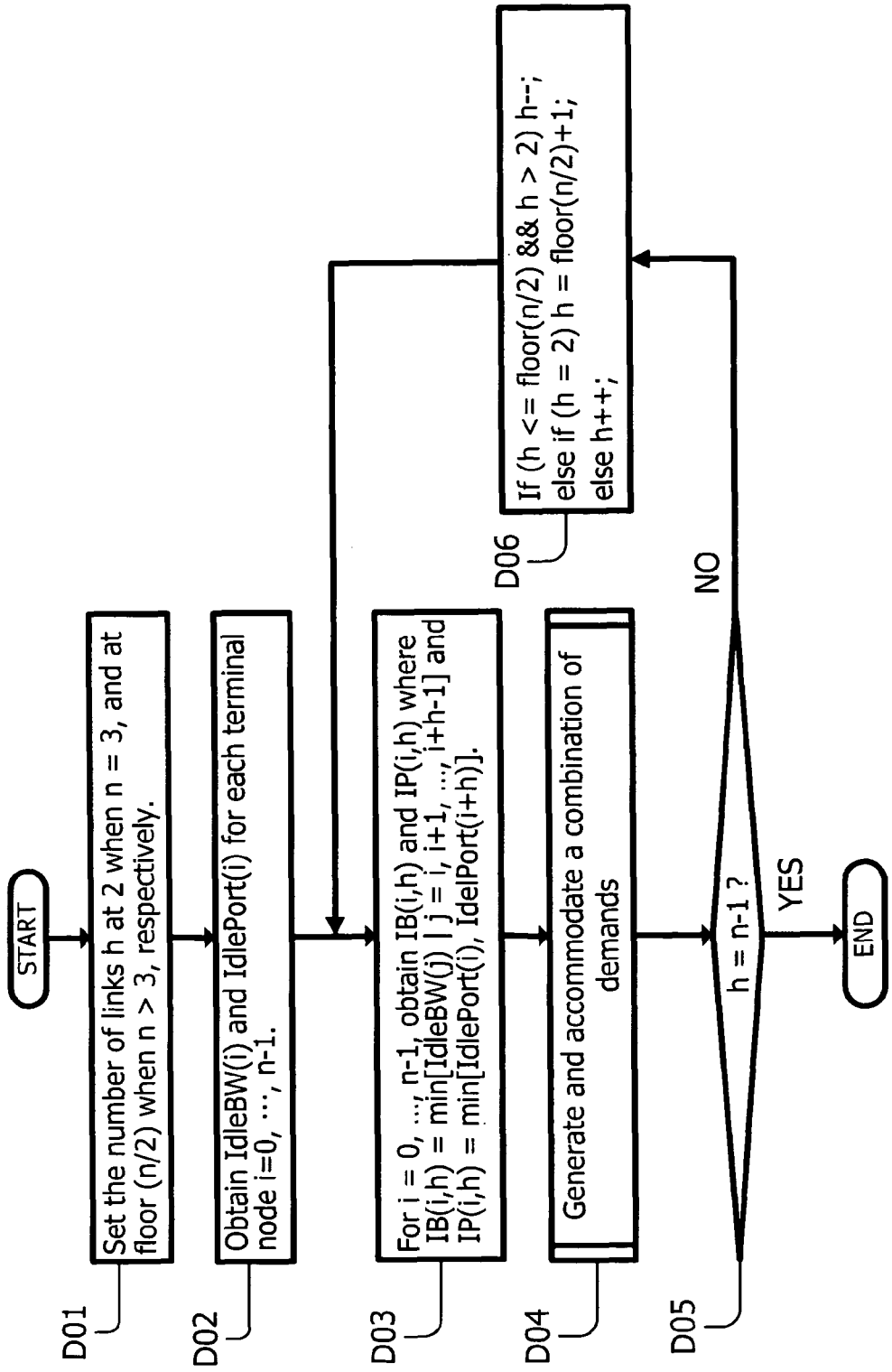
FIG. 23 is a diagram illustrating an example (1) of an operation flow for accommodating plural-link demands according to the embodiment.

FIG. 23 is a diagram illustrating an example (1) of an operation flow for accommodating plural-link demands according to the embodiment, showing the details of step S2203 in FIG. 18. Herein, the number of links of a plural-link demand is represented by "h", and the number of terminal nodes on the demand accommodating ring is represented by "n".

In step D01, when n=3, the number of links h is set at "2". When n>3, h is set at "floor (n/2)", that is, h=floor (n/2) is set.

In step D02, for i=0, ..., n−1, an idle bandwidth IdleBW(i) and a number of idle ports IdlePort(i) between the nodes (i) and (i+1) are obtained, where (i+1) set at "0" when i becomes (n−1).

In step D03, for i=0, ..., n−1, IB(i, h) and IP(i, h) defined as the following are obtained.

$IB(i,h) = \min[IdleBw(j) | j=i, i+1, \ldots, i+h-1]$ $IP(i,h) = \min[IdlePort(i), IdlePort(i+h)]$ In step D04, from among pairs of terminal nodes pointed by demands having h links, accommodation of the combination of demands is additionally tried between the node pairs where demands can be added (that is, IB(i, h)>0 and IP(i, h)>0) and the combination of demands have not been additionally tried yet. The details of step D04 will be described later with reference to FIG. 24.

In step D05, after ending the accommodation of demands having the h links, it is determined whether or not "h=n−1" is established. If h=n−1 (YES in step D05), the processing ends. If "h=n−1" is not established (NO in step D05), the processing advances to step D06.

In step D06, the number of links h is updated and the processing returns to step D03 so that the accommodation of demands are additionally tried. Herein, the number of links h is updated as follows: h is counted down by 1 (−1) when h≦floor(n/2) and h>2, h is set at "floor(n/2)+1" when h=2, and h is counted up by 1 (+1) in other cases.

As mentioned above, plural-link demands, that is, demands having a plurality of links is additionally accommodated to the idle bandwidth on the demand accommodating ring to which single-link demands have been already accommodated by step S2201 of FIG. 18.

Herein, firstly, client signal paths are sequentially accommodated between the pairs of terminal nodes pointed by plural-link demands having the number of links smaller than approximately half of the maximum number of links, in the descending order of the number of links. Next, client signal paths are sequentially accommodated between the pairs of terminal nodes pointed by plural-link demands having the number of links greater than approximately half of the maximum number of links, in the ascending order of the number of links.

For example, in the case of the demand accommodating ring consisting of n demand terminal nodes (where n>3), demands having the number of links between 2 and floor(n/2) are sequentially accommodated in the order of floor(n/2) to 2. Next, demands having the number of links between [(floor(n/2)+1] and (n−1) are accommodated in the order of [floor(n/2)+1] to (n−1). Here, in the case of n=3, the combination of demands is additionally tried only for the demands having the number of links 2.

FIG. 24 is a diagram illustrating an example (2) of an operation flow for accommodating plural-link demands according to the embodiment, showing the details of step D04 in FIG. 23.

Let IP(i, h) be the number of idle communication ports between the terminal nodes (i) and (i+h), and let IB(i, h) be the idle bandwidth therebetween. The following steps D0401 to D0402 are performed for i while there is at least one i (0≦i≦n−1) that satisfies a condition that IB(i, h)>0, IP(i, h)>0, and generation of combination of demands between the nodes i and (i+1) has not been tried yet.

In step D0401, with respect to routes having the idle bandwidth (i.e. IB(i, h)>0) and the maximum number of idle communication ports (i.e. IP(i, h)) among routes between the terminal nodes (i.e. routes between nodes (i) and (i+h)) where the generation and accommodation of the combination of demands have not been additionally tried yet, additional combination of demands is generated and accommodated for demands having the bandwidth of IB(i, h) or less among the remaining demands to be accommodated. Here, the number of communication ports for generating the combination of demands is set at IP(i, h) and the signal bandwidth for accommodating demands is set at IB(i, h).

In step D0402, depending on the added demand, IP(i, h), IB(i, h), IdleBW(i) to IdleBW(i+h−1), IdlePort(i), and IdlePort(i+h) are updated.

Figure 25:
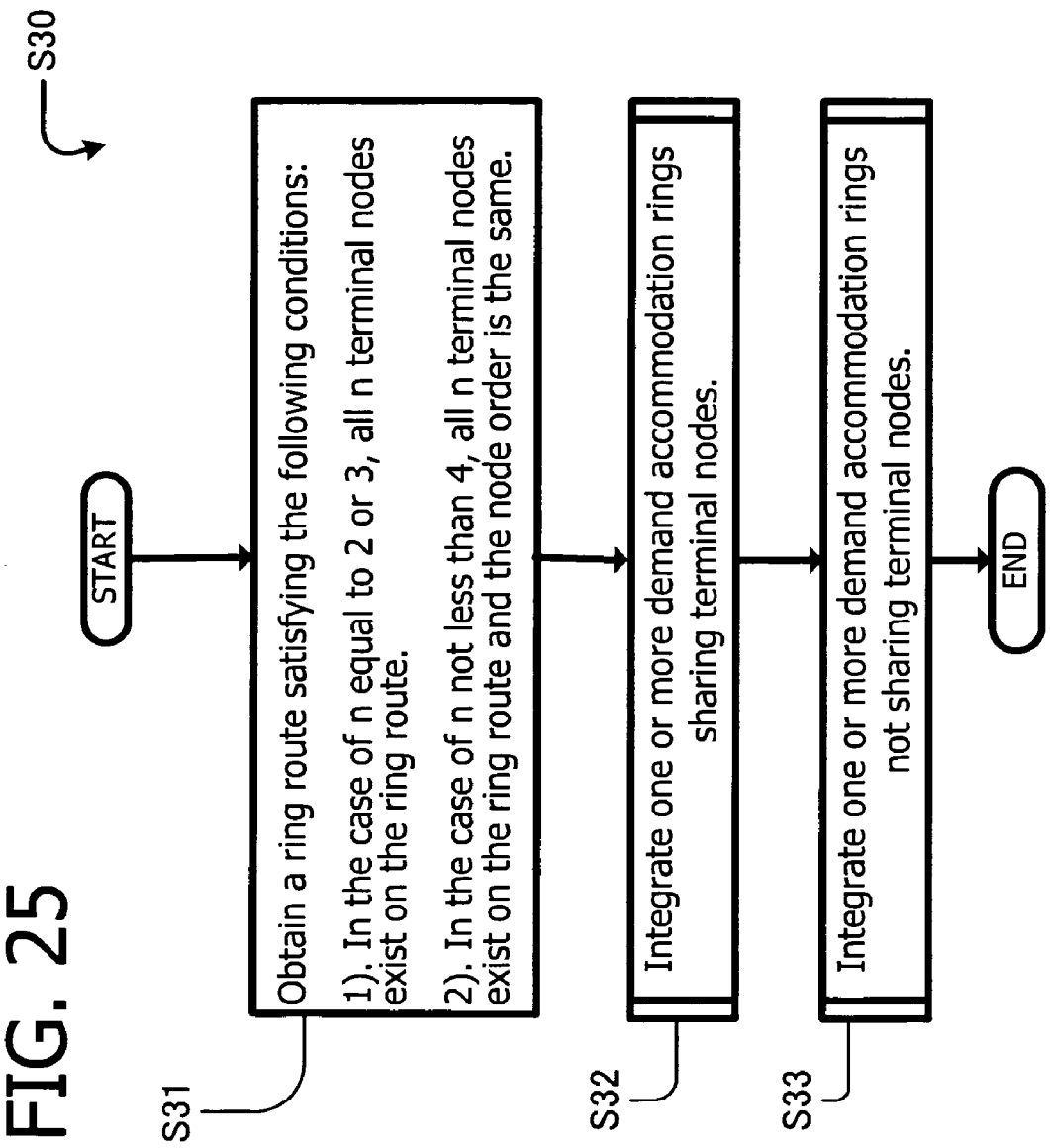
FIG. 25 is a diagram illustrating an example (1) of an operation flow for integrating demand accommodating rings according to the embodiment.

FIG. 25 is a diagram illustrating an example (1) of an operation flow for integrating demand accommodating rings according to the embodiment, showing the details of step S30 in FIG. 5.

In step S30 of FIG. 5, by multiplexing demand accommodating rings generated in step S20 in FIG. 5 (e.g., SONET rings) into one ring, a plurality of demand accommodating rings are integrated to one ring as an integrated demand accommodating ring. Here, a plurality of integrated demand accommodating rings may be generated. As a method for multiplexing demand accommodating rings, methods described in Japanese Patent Application Nos. 2006-123908 and 2006-269361 can be used. However, according to the embodiment, extension is added for considering the node order on the ring. Specifically, the extension is added to a condition for determining a ring route capable of including the demand accommodating rings and a condition for determining whether the demand accommodating rings can be multiplexed or not.

In step S31, as pre-processing for multiplexing the rings (for example, the SONET rings), ring routes to which each of the demand accommodating rings can topologically belong are checked. Here, as the ring routes to be checked, ring routes obtained by the search in step S10 in FIG. 5 are used. Although the demand accommodating ring obviously can be accommodated to the ring route which is used for generating the demand chain in step S20 of FIG. 5, the demand accommodating ring may be accommodated to another ring route.

Here, n terminal nodes on the demand accommodating ring are checked, in the case that the number of terminal nodes n is 3 or less, by determining whether all the n terminal nodes exist on the ring route to be checked or not, and checked, in the case that n is 4 or more, by determining whether all the n terminal nodes exist on the ring route to be checked and the node order thereof is the same (i.e. the arrangement order of the n terminal nodes matches one of node orders of clockwise or counter-clockwise directions on the ring route to be checked) or not.

In step S32, a plurality of demand accommodating rings (e.g., SONET rings) sharing the demand terminal nodes are integrated. As a consequence, the number of transmitting and receiving apparatuses can be reduced because of the sharing of the transmitting and receiving apparatus, and the number of demand accommodating rings can be also reduced. The details of step S32 will be described later with reference to FIGS. 26 and 27.

In step S33, a plurality of demand accommodating rings (e.g., SONET rings) not sharing the terminal nodes are integrated. Thereby, the number of demand accommodating rings is reduced. The details of step S33 will be described later in FIG. 28.

Figure 26:
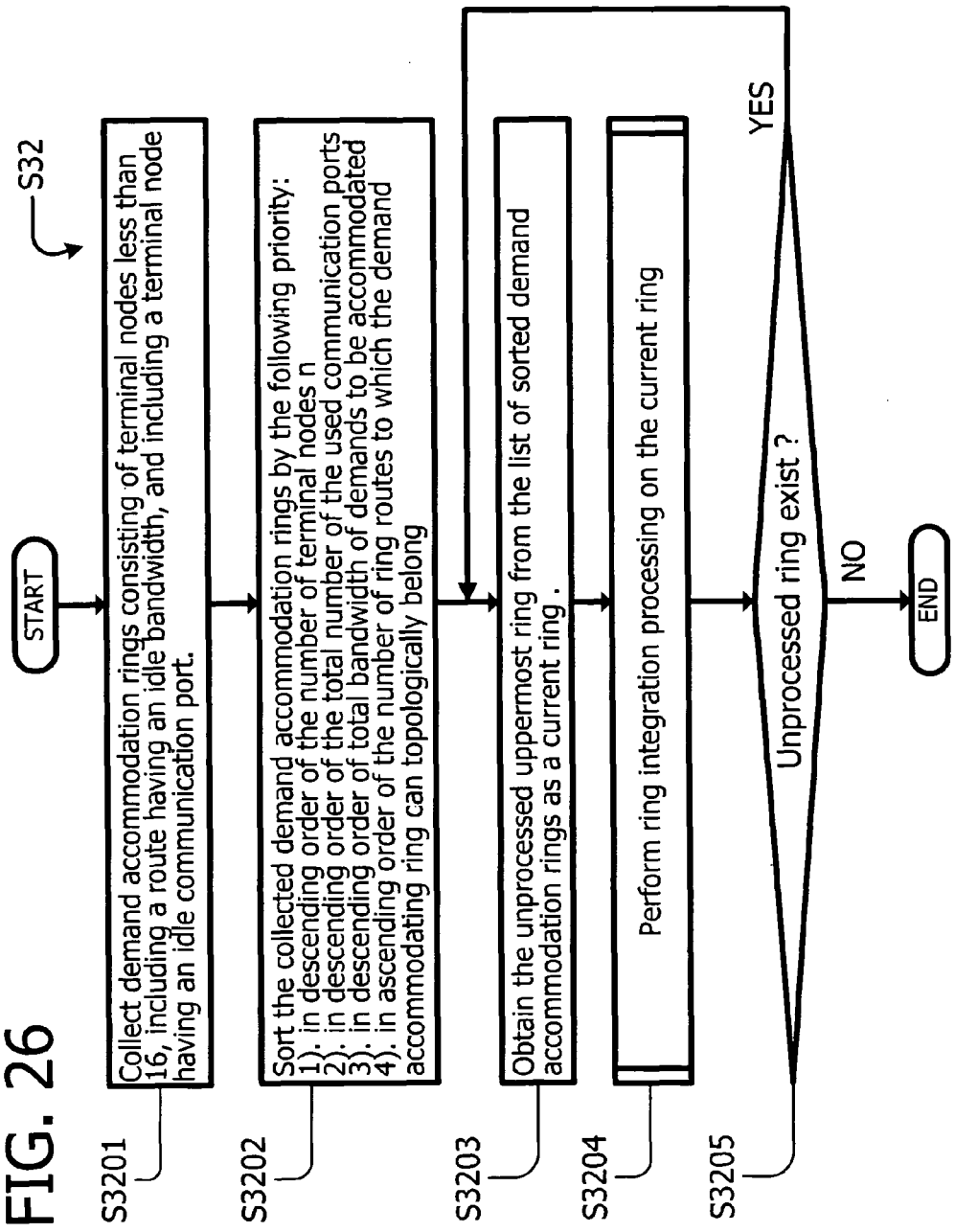
FIG. 26 is a diagram illustrating an example (2) of an operation flow for integrating demand accommodating rings according to the embodiment.

FIG. 26 is a diagram illustrating an example (2) of an operation flow for integrating demand accommodating rings according to the embodiment, showing the details of step S32 in FIG. 25. In the case, an operation flow for integrating demand accommodating rings that share the terminal node each other is described.

In step S3201, demand accommodating rings (e.g., SONET rings) having terminal nodes less than 16 and including a route with a idle bandwidth and a node with an idle communication port, are collected.

In step S3202, the demand accommodating rings collected in step S3201 are sorted by the following priority:

(First priority) Descending order of the number of terminal nodes n, (Second priority) Descending order of the total number of the used communication ports, (Third priority) Descending order of the total bandwidth of demands to be accommodated, (Fourth priority) Ascending order of the number of ring routes to which the demand accommodating rings can topologically belong.

In step S3203, the uppermost unprocessed ring in the list of sorted demand accommodating rings, is set as a current ring.

In step S3204, the ring integration processing is performed on the current ring. Details of step 3204 will be described later with reference to FIG. 27.

In step S3205, it is determined whether or not the list of sorted rings created in step S3202 includes a ring on which the ring integration processing in step S3204 has not been performed yet. When the list includes an unprocessed ring (YES in step S3205), the processing returns to step S3203. When the list does not include any unprocessed ring (NO in step S3205), the processing ends.

Figure 27:
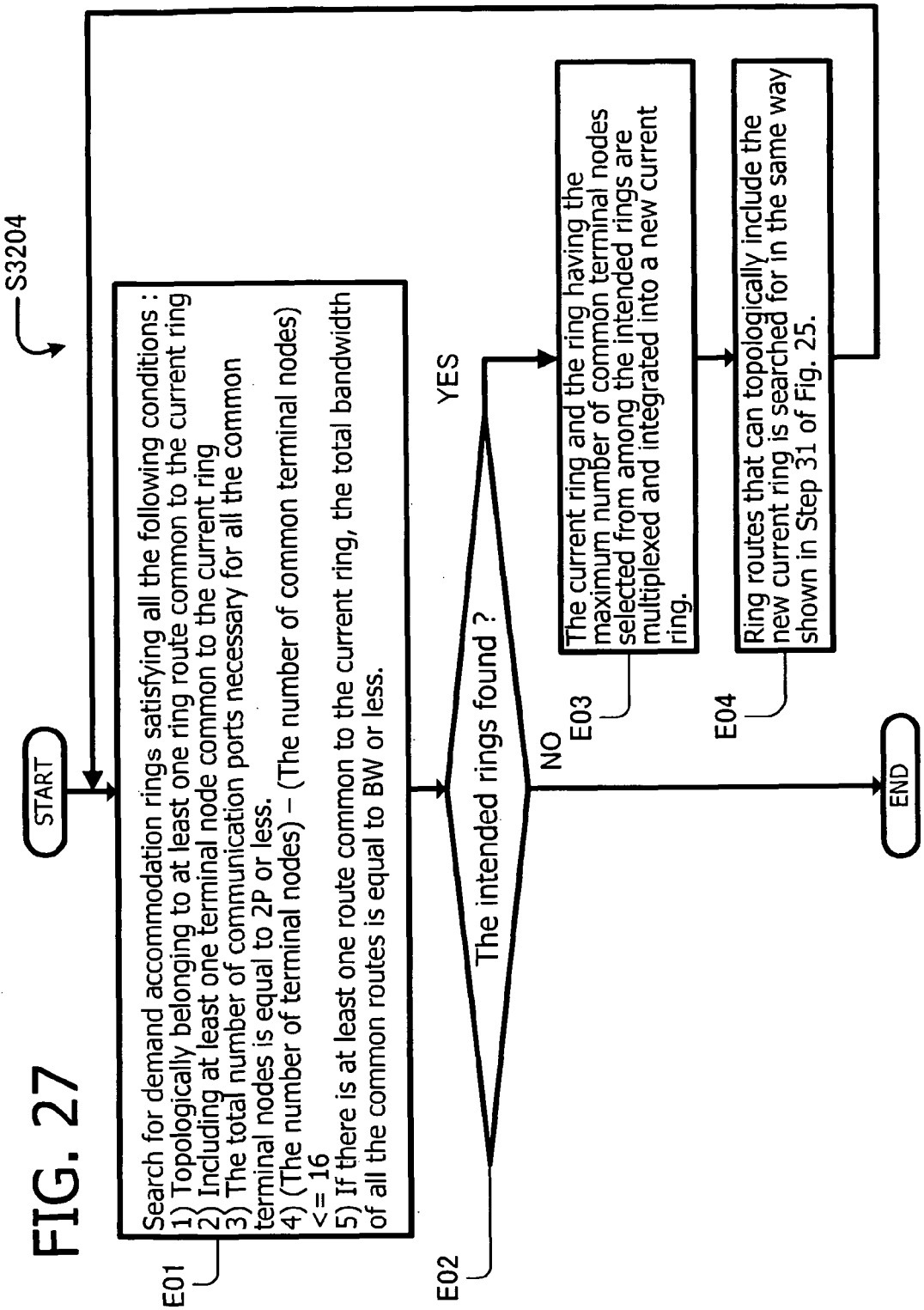
FIG. 27 is a diagram illustrating an example (3) of an operation flow for integrating demand accommodating rings according to the embodiment.

FIG. 27 is a diagram illustrating an example (3) of an operation flow for integrating demand accommodating rings according to the embodiment, showing the details of step S3204 in FIG. 26.

In step E01, for the current ring, the list of the sorted demand accommodating rings is searched for demand accommodating rings satisfying the following conditions.

(Condition 1) Topologically belonging to at least one ring route common to the current ring (Condition 2) Including at least one terminal node common to the current ring (Condition 3) The total number of communication ports necessary for all the common terminal nodes is equal to 2P or less.

(Condition 4) (The number of terminal nodes)−(The number of common terminal nodes)≦16 (in case of SONET BLSR).

(Condition 5) If there is at least one route common to the current ring, the total bandwidth of all the common routes is equal to BW or less.

Herein, if the number of terminal nodes is 2 (that is, n=2), as will be described later with reference to FIG. 29A, there exist two possible patterns of demand accommodating routes. Therefore, the demand accommodating ring is searched for with the two patterns.

In step E02, it is determined whether or not there exists a demand accommodating ring satisfying all the above conditions in step E01. If there exists at least one demand accommodating ring satisfying all the conditions (YES in step E02), the processing advances to step E03. If there exist no demand accommodating rings satisfying all the conditions (NO in step E03), the processing ends.

In step E03, from among demand accommodating rings satisfying the above conditions, the demand accommodating rings having the maximum number of common terminal nodes are selected. And the current ring and the uppermost selected demand accommodating ring in the list are multiplexed and integrated into a new current ring.

In step E04, similarly to step S31 in FIG. 25, ring routes that can topologically include the new current ring is searched for and the processing returns to step E01.

In the integration processing of the demand accommodating rings shown in FIGS. 26 and 27, as shown in step S3202 in FIG. 26, rings are sorted in the list firstly based on the number of terminal nodes (descending order). And the rings are multiplexed and integrated in consideration of the total number of terminal nodes and the total bandwidth of the common routes. Thereafter, as shown in step E04 in FIG. 27, ring routes which can topologically include the integrated demand accommodating ring are searched for, and the searched ring route is held for next processing.

Here, if the demand accommodating ring on which the integration processing is performed includes only two terminal nodes, the direction of the route to which combination of demands is accommodated can be clockwise or counter-clockwise. Therefore, two accommodation patterns need to be checked. Thus, for example, in the case of integrating two demand accommodating rings each having only two terminal nodes, four patterns need to be checked.

Figure 28:
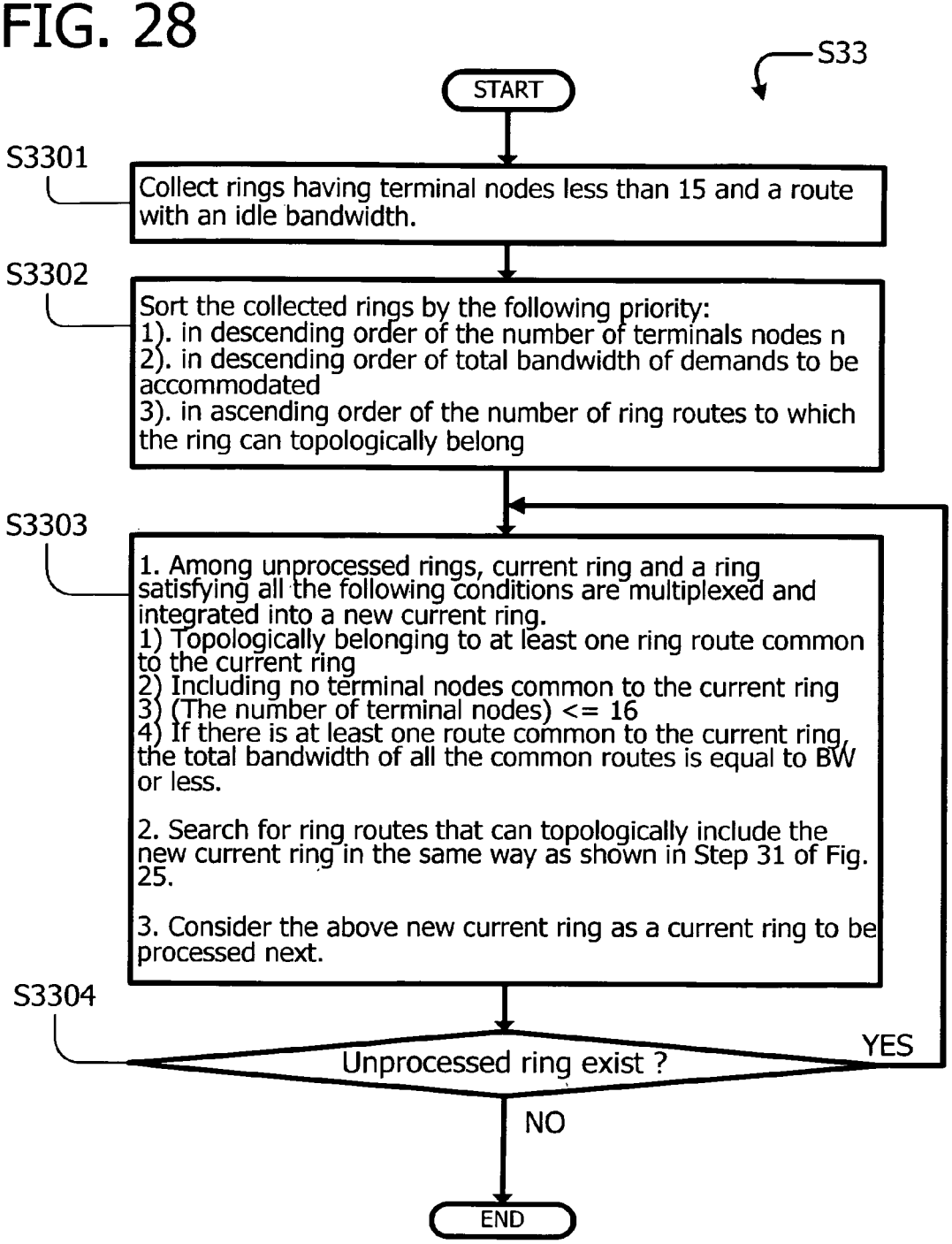
FIG. 28 is a diagram illustrating an example (4) of an operation flow for integrating demand accommodating rings according to the embodiment.

FIG. 28 is a diagram illustrating an example (4) of an operation flow for integrating demand accommodating rings according to the embodiment, showing the details in step S33 in FIG. 25. In the case, an operation flow for integrating demand accommodating rings which share no terminal nodes each other is described.

In step 3301, demand accommodating rings having terminal nodes less than 15 and having at least one route with an idle bandwidth are collected.

In step S3302, the demand accommodating rings collected in step S3301 are sorted with the following priorities.

(First priority) In the descending order of the number of terminal nodes included therein (Second priority) In the descending order of the total bandwidth thereof (Third priority) In the ascending order of the number of ring routes which can topologically include the demand accommodating ring.

In step S3303, from among the unprocessed rings on the list of demand accommodating rings sorted in step S3303, the current ring and the uppermost ring that satisfies all the following conditions are integrated as a new current ring.

(Condition 1) Topologically belonging to at least one ring route common to the current ring (Condition 2) Including no terminal nodes common to the current ring (Condition 3) (The number of terminal nodes)$\leq 16$ (in case of SONET BLSR).

(Condition 4) If there is at least one route common to the current ring, the total bandwidth of all the common routes is equal to BW or less.

Herein, if at least one of the demand accommodating rings to be integrated has only 2 terminal nodes (i.e., n=2), as will be described later with reference to FIG. 29A, there are two patterns of demand accommodating rings, and the two patterns must be checked.

The new current ring integrated above is considered as a current ring to be processed next.

Then, ring routes to which the new current ring can topologically belong are searched in the same way shown in step 31 of FIG. 25.

In step S3304, it is determined whether or not the list of the sorted demand accommodating rings includes an unprocessed ring. When the list includes an unprocessed ring (YES in step S3304), the processing returns to step S3303. When the list includes no unprocessed rings (NO in step S3304), the processing ends.

Figure 29A:
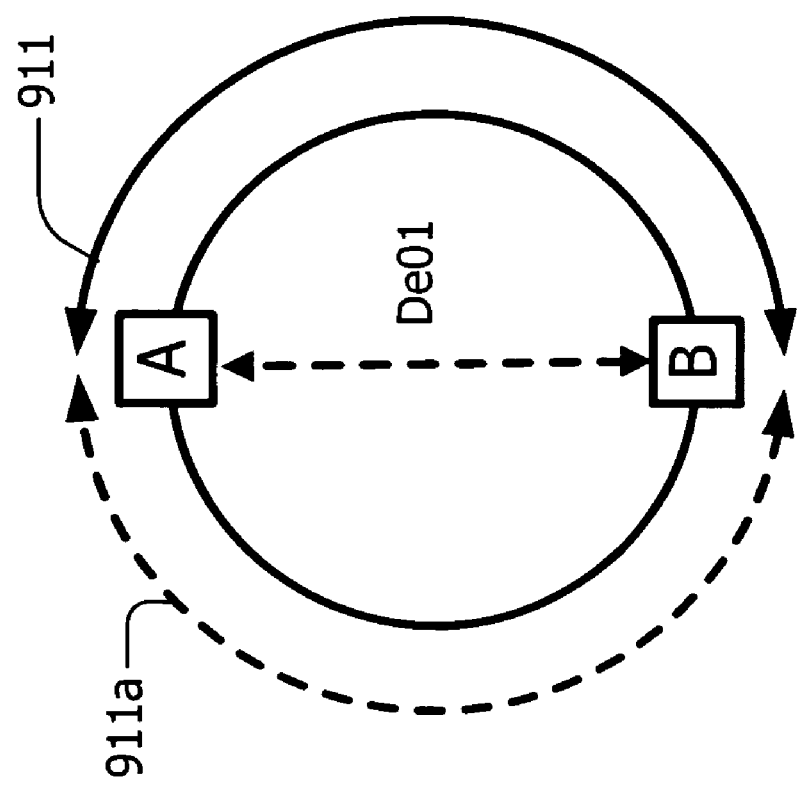
FIGS. 29A and 29B are diagrams illustrating an example of demand accommodating route according to the embodiment.

FIGS. 29A and 20B are diagrams illustrating an example of demand accommodating route according to the embodiment, showing the difference between the case of two terminal nodes and other cases.

In the case of a demand accommodating ring having only two terminal nodes as shown in FIG. 29A, a demand De01 pointing terminal nodes A and B which are used as the common terminal nodes when integrating the demand accommodating rings, can be accommodated to either a route 911 or a route 911a in the predetermined rotation direction.

Figure 29B:
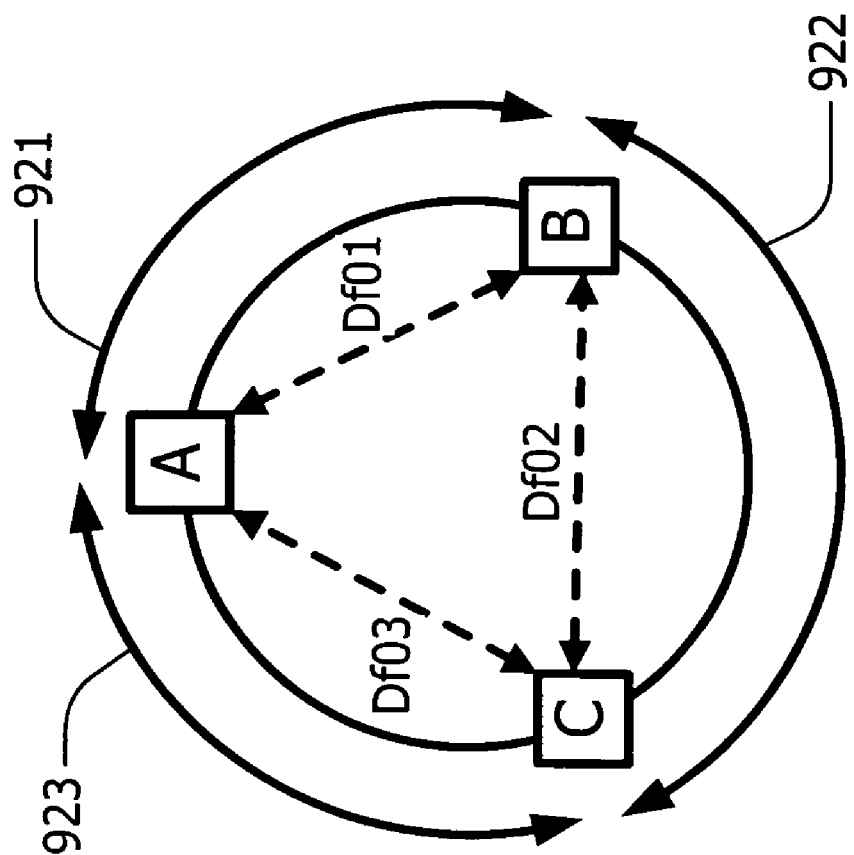

On the other hand, in the case of a demand accommodating ring having three terminal nodes as shown in FIG. 29B, a route for accommodating a demand Df01 between the terminal nodes A and B is fixed to a route 921, and routes for accommodating other demands Df02 and Df03 are also fixed to routes 922 and 923, respectively, in the predetermined rotation direction. Although the reference numeral 92 depicts a typical example of the demand accommodating ring having three terminal nodes, routes for accommodating demands are similarly fixed in the case of demand accommodating rings having four or more terminal nodes.

Therefore, when determining whether or not two demand accommodating rings can be integrated to one ring, for the demand accommodating ring having only two terminal nodes, it is necessary to consider two routes for accommodating demands. When each of the two demand accommodating rings has only two terminal nodes, it is necessary to consider the total number of four combinations of routes for accommodating demands.

Figure 30:
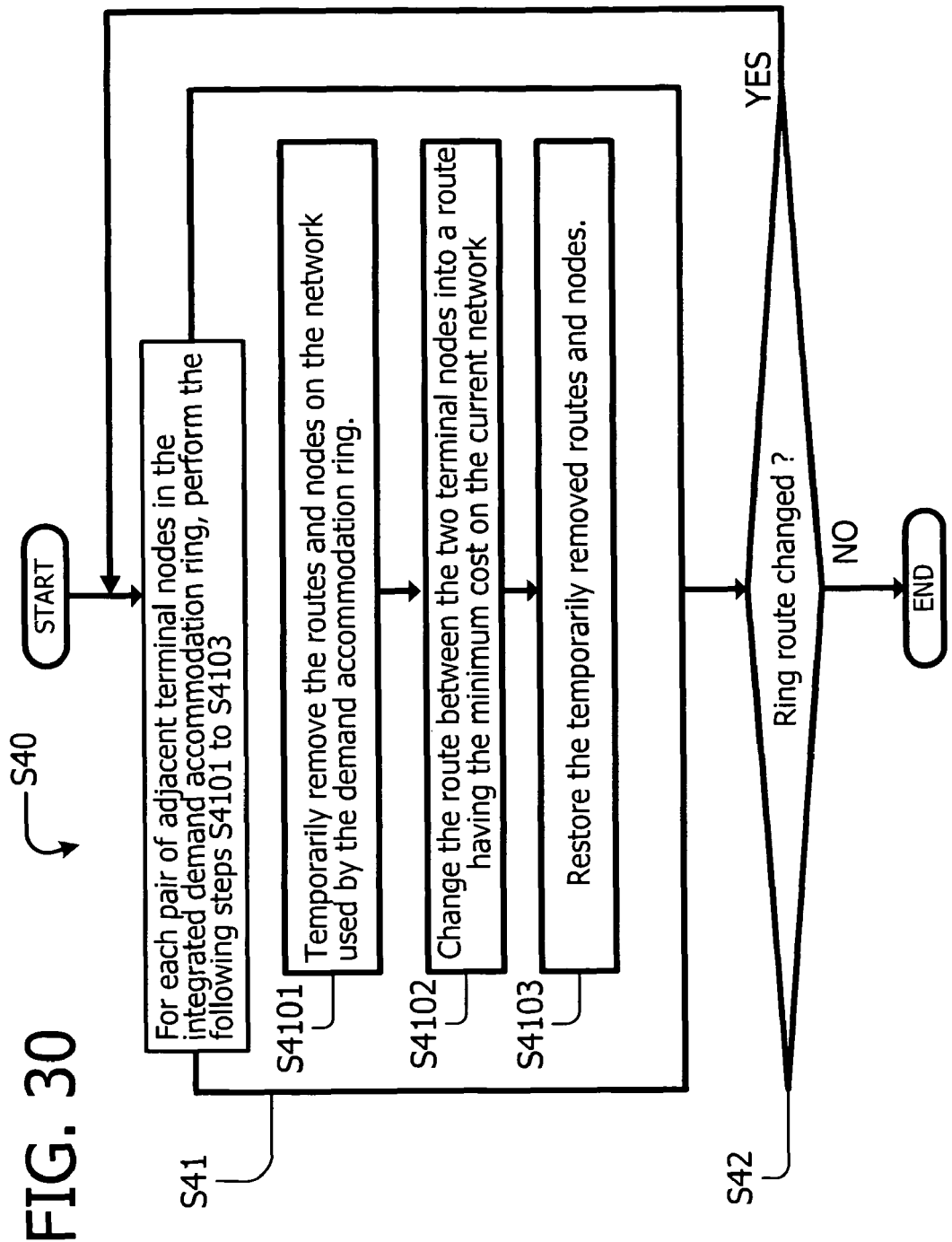
FIG. 30 is an example of an operation flow for minimizing a route on the demand accommodating ring according to the embodiment.

FIG. 30 is an example of an operation flow for minimizing a route on the demand accommodating ring according to the embodiment, showing the details of step S40 in FIG. 5. Herein, the integrated demand accommodating ring generated in step S30 of FIG. 5 is minimized.

In step S41, for each pair of adjacent terminal nodes in the integrated demand accommodating ring, following processing of steps S4101 to S4103 is performed.

In step S4101, routes and nodes on the network used by the demand accommodating ring are temporarily removed, except for the pair of adjacent terminal nodes to be processed and the route therebetween.

In step S4102, a route having the minimum cost between the two terminal nodes to be processed is searched for and the route between the two terminal nodes to be processed is changed to the route found by searching having the minimum cost. That is, the route with the minimum cost is obtained by excluding the influence from the node and the route used by other nodes on the integrated demand accommodating ring in step S4101. As the search of the route having the minimum cost, for example, a well-known Dijkstra algorithm can be applied. As the cost, for example, the distance of the optical fiber, the number of stations (the number of links), and optical transmission quality can be used. Further, in the case that the number of terminal nodes n is 2, a well-known algorithm for searching for the minimum redundant route between the two nodes can be used.

In step S4103, the nodes and routes that are temporarily removed in step S4101 are restored.

In step S42, it is determined whether or not the ring route of the integrated demand accommodating ring has been changed by the processing in step S41. When the ring route has been changed (YES in step S42), the processing returns to step S41. When the ring route has not been changed (NO in step S42), the processing ends.

The above processing of steps S41 and S42 represent processing regarding one integrated demand accommodating ring. However, this processing can be performed on each of all the integrated demand accommodating rings generated in step S30 in FIG. 5.

What is claimed is:

1. A method for establishing signal paths on a ring network, comprising:
   providing a demand set including one or more traffic demands each being defined as a traffic demand record indicating a requisite condition for establishing at least one signal path between a pair of terminal nodes on the ring network, the traffic demand record including a pair of terminal node identifiers and a link cost, the pair of terminal node identifiers identifying the pair of terminal nodes between which the at least one signal path is to be established and the link cost indicating a cost for transferring traffic between the pair of terminal nodes;
   associating each of the one or more traffic demands with a demand accommodating route on the ring network, the demand accommodating route connecting the pair of terminal nodes identified by the traffic demand record, in a given rotational direction along the ring network;
   performing a demand chain generation procedure of generating one or more demand chains each defined as a series of traffic demands so that a sequence of demand accommodating routes associated with the series of traffic demands are arranged along the ring network in the same order of the series of traffic demands, and adjacent two demand accommodating routes have contact with each other via one terminal node;
   selecting, from among the one or more demand chains, a first demand chain having a maximum number of traffic demands; and
   establishing said at least one signal path, based on traffic demand records defining the first demand chain, on each of the sequence of demand accommodating routes associated with the selected first demand chain.

2. The method of claim 1, wherein,
   when a plurality of demand chains are selected as the first demand chain, a total sum of link costs of traffic demands included in each of the plurality of demand chains is calculated as a total link cost of each of the plurality of demand chains,
   the demand chain having a maximum total link cost among the plurality of demand chains is determined as a maximum cost demand chain, and
   at least one signal path is established, based on traffic demand records defining the maximum cost demand chain, on each of the sequence of demand accommodating routes associated with the maximum cost demand chain.

3. The method of claim 1, wherein the demand chain generation procedure comprises:
   selecting, from among terminal nodes identified by the traffic demand records defining the one or more traffic demands, a start node;
   repeating a demand chain selection procedure including:
      selecting, for a given terminal node, from among the one or more traffic demands, a demand group including traffic demands each of which identifies the given terminal node as one of the pair of terminal nodes identified and has not been processed yet by the demand group selection procedure;
      selecting, from among the selected demand group, one traffic demand as a next hop traffic demand, and
      determining the other one of the pair of terminal nodes identified by the selected one traffic demand as a next-hop terminal node which is processed next as a next given terminal node, wherein
   the start node is provided as the given terminal node at a first repeating time, and the demand chain selection procedure is repeated, by setting the determined next-hop terminal node as the next given terminal node to be processed next, until the demand group can not be selected any more from among the one or more traffic demands;
   obtaining a series of traffic demands selected by repeating the demand chain selection procedure; and
   determining the obtained series of traffic demands as a demand chain, wherein a terminal node positioned at a tail end of a sequence of demand accommodating routes associated with the obtained demand chain is determined as a reached node of the demand chain.

4. The method of claim 3, wherein the demand chain selection procedure further comprises:
   accumulating a link cost from a given node to a searched node;
   obtaining a total link cost for the demand chain by calculating the total sum of link costs from the start node to the reached node identified by the demand chain, and
   wherein when a plurality of demand chains are selected as the first demand chain,
   the demand chain having the maximum accumulated link cost among the plurality of demand chains is determined as a maximum cost demand chain, and
   at least one signal path is established, based on traffic demand records defining the maximum cost demand chain, on each of the sequence of demand accommodating routes associated with the maximum cost demand chain.

5. The method of claim 3, wherein a terminal node identified by a largest number of different traffic demands in the one or more traffic demands is determined as the start node.

6. The method of claim 1, further comprising:
   defining a demand accommodating ring as a ring route having a capacity of a predetermined bandwidth and including the sequence of demand accommodating routes associated with the first demand chain;
   providing each terminal node on the demand accommodating ring, with one or more transmitting and receiving apparatuses each including one or more communication ports;
   performing a single-link demand accommodation procedure of establishing signal paths identified by at least one single-link demand on the demand accommodating ring, wherein a single-link demand is defined as a traffic demand associated with a demand accommodating route connecting a pair of terminal nodes via single link on the demand accommodating ring;
   performing a plural-link demand accommodation procedure of establishing signal paths identified by at least one plural-link demand on the demand accommodating ring after performing the single-link demand accommodation procedure, and
   wherein a plural-link demand is defined as a traffic demand associated with a demand accommodating route that connects a pair of terminal nodes via a plurality of links along the demand accommodating ring, and a number of links between the pair of terminal nodes is defined as a number of links of the plural-link demand.

7. The method of claim 6, wherein, in the single-link demand accommodation procedure, one or more single-link demands are selected from the demand set so that utmost signal paths identified by the selected one or more single-link demands are set to each of the transmitting and receiving apparatuses, by using an utmost number of available communication ports included in the transmitting and receiving apparatuses.

8. The method of claim 6, wherein the plural-link demand accommodation procedure comprises:
defining a natural number m as the maximum natural number not greater than n/2 where n is the number of terminal nodes on the demand accommodating ring;
establishing signal paths identified by plural-link demands having the number of links from m to 2, in the descending order of the number of links, along the demand accommodating ring; and
establishing signal paths identified by plural-link demands having the number of links from m+1 to n−1, in the ascending order of the number of links, along the demand accommodating ring.

9. The method of claim 1, wherein the link cost of each of the one or more traffic demands is defined as a bandwidth needed for transferring data between the pair of terminal nodes identified by the each of the one or more traffic demands.

* * * * *

UNITED STATES PATENT AND TRADEMARK OFFICE
CERTIFICATE OF CORRECTION

| | | |
|---|---|---|
| PATENT NO. | : 7,830,789 B2 | Page 1 of 1 |
| APPLICATION NO. | : 12/215449 | |
| DATED | : November 9, 2010 | |
| INVENTOR(S) | : Tomohiro Hashiguchi et al. | |

It is certified that error appears in the above-identified patent and that said Letters Patent is hereby corrected as shown below:

Column 27, Line 63 in Claim 3, delete "group" and insert -- chain --, therefor.

Signed and Sealed this
Twenty-fifth Day of January, 2011

David J. Kappos
*Director of the United States Patent and Trademark Office*